US012769221B2

(12) United States Patent
Choda et al.

(10) Patent No.: US 12,769,221 B2
(45) Date of Patent: Oct. 20, 2026

(54) ELECTROPHOTOGRAPHIC PHOTORECEPTOR, ELECTROPHOTOGRAPHIC PHOTORECEPTOR CARTRIDGE, AND IMAGE FORMING DEVICE

(71) Applicant: Mitsubishi Chemical Corporation, Tokyo (JP)

(72) Inventors: Takahiro Choda, Tokyo (JP); Akira Ando, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 649 days.

(21) Appl. No.: 18/135,830

(22) Filed: Apr. 18, 2023

(65) Prior Publication Data

US 2023/0296995 A1 Sep. 21, 2023

Related U.S. Application Data

(63) Continuation of application No. PCT/JP2021/035812, filed on Sep. 29, 2021.

(30) Foreign Application Priority Data

Oct. 21, 2020 (JP) ................................ 2020-176567

(51) Int. Cl.
*G03G 5/047* (2006.01)
*G03G 5/06* (2006.01)
(Continued)

(52) U.S. Cl.
CPC ....... *G03G 5/047* (2013.01); *G03G 5/061443* (2020.05); *G03G 5/06149* (2020.05);
(Continued)

(58) Field of Classification Search
None
See application file for complete search history.

(56) References Cited

U.S. PATENT DOCUMENTS 5,879,847 A 3/1999 Yoshinaga et al.
6,936,387 B2 8/2005 Yao et al.
(Continued)

FOREIGN PATENT DOCUMENTS

JP H09-190004 A 7/1997
JP H10-48859 A 2/1998
(Continued)

OTHER PUBLICATIONS

Translation of JP 2017-107004.*
(Continued)

*Primary Examiner* — Peter L Vajda
(74) *Attorney, Agent, or Firm* — Morgan, Lewis & Bockius LLP

(57) ABSTRACT

There is provided an electrophotographic photoreceptor including: a conductive support; and a photosensitive layer and a protective layer containing a cured product obtained by curing a curable compound, which are sequentially disposed on the conductive support. The photoreceptor has a Martens hardness of 255 $N/mm^2$ or more. The photosensitive layer contains at least a hole transport material (HTM), and an energy difference between a HOMO level and a LUMO level of the hole transport material (HTM) is greater than 3.6 eV and 4.0 eV or less.

19 Claims, 1 Drawing Sheet

(51) Int. Cl.
*G03G 5/147* (2006.01)
*G03G 21/18* (2006.01)

(52) U.S. Cl.
CPC ..... *G03G 5/14704* (2013.01); *G03G 5/14773* (2013.01); *G03G 21/1814* (2013.01)

(56) References Cited

U.S. PATENT DOCUMENTS

| | | | |
|---|---|---|---|
| 11,029,616 B2 | 6/2021 | Kujirai et al. |
| 2003/0054271 A1 | 3/2003 | Yao et al. |
| 2008/0176154 A1 | 7/2008 | Gyoutoku |
| 2019/0369529 A1 | 12/2019 | Yagi et al. |
| 2020/0393775 A1 | 12/2020 | Kujirai et al. |

FOREIGN PATENT DOCUMENTS

| | | | | |
|---|---|---|---|---|
| JP | 2002-318459 A | | 10/2002 | |
| JP | 2002-341575 A | | 11/2002 | |
| JP | 2003-316035 A | | 11/2003 | |
| JP | 2003-345049 A | | 12/2003 | |
| JP | 2008-058779 A | | 3/2008 | |
| JP | 2008-145737 A | | 6/2008 | |
| JP | 2009-020504 A | | 1/2009 | |
| JP | 2010-139649 A | | 6/2010 | |
| JP | 2013-246364 | * | 12/2013 | ............ G03G 5/047 |
| JP | 2013-246364 A | | 12/2013 | |
| JP | 2014-163984 A | | 9/2014 | |
| JP | 2014-167555 A | | 9/2014 | |
| JP | 2014-209222 A | | 11/2014 | |
| JP | 2015-018169 A | | 1/2015 | |
| JP | 2016-126040 A | | 7/2016 | |
| JP | 2016-186593 A | | 10/2016 | |
| JP | 2017-009765 A | | 1/2017 | |
| JP | 2017-107004 | * | 6/2017 | ............ G03G 5/147 |
| JP | 2017-125946 A | | 7/2017 | |
| JP | 2019-035856 A | | 3/2019 | |
| JP | 2019-211774 A | | 12/2019 | |
| JP | 2020-201465 A | | 12/2020 | |

OTHER PUBLICATIONS

Translation of JP 2013-246364.*
International Search Report issued in corresponding International Patent Application No. PCT/JP2021/035812 dated Dec. 21, 2021.

* cited by examiner

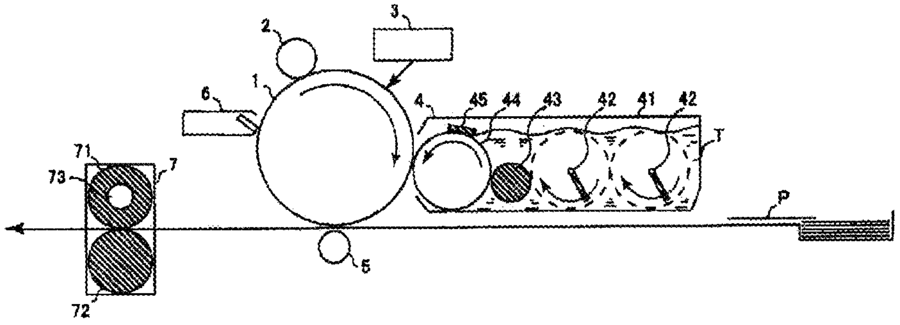
1
2
3
4
45
44
43
42
41
42
T
6
7
71
72
73
5
P

ELECTROPHOTOGRAPHIC PHOTORECEPTOR, ELECTROPHOTOGRAPHIC PHOTORECEPTOR CARTRIDGE, AND IMAGE FORMING DEVICE

TECHNICAL FIELD

The present invention relates to an electrophotographic photoreceptor, an electrophotographic photoreceptor cartridge, and an image forming device to be used in a copier, a printer, and the like.

BACKGROUND ART

In a printer, a copier, and the like, when a charged organic photoreceptor (OPC) drum is irradiated with light, a charge is eliminated from the portion to generate an electrostatic latent image, and a toner adheres to the electrostatic latent image, whereby an image can be obtained. In devices using such electrophotographic technology, a photoreceptor is a basic member.

In this type of organic photoreceptor, a "function separate photoreceptor" in which functions of generating and moving negative charges are shared by separate compounds has been becoming mainstream because there is much room for material selection and characteristics of the photoreceptor are easy to control. For example, there has been known a single-layered electrophotographic photoreceptor (hereinafter, referred to as a "single-layered photoreceptor") with a charge generation material (CGM) and a charge transport material (CTM) in the same layer, and a multi-layered electrophotographic photoreceptor (hereinafter, referred to as a multi-layered photoreceptor) in which a charge generation layer containing a charge generation material (CGM) and a charge transport layer containing a charge transport material (CTM) are laminated. Examples of a charging method for a photoreceptor include a negative charging method by which a photoreceptor surface is negatively charged and a positive charging method by which a photoreceptor surface is positively charged.

Examples of a combination of a layer configuration and a charging method of a photoreceptor currently in practical use include a "negatively charged multi-layered photoreceptor" and a "positively charged single-layered photoreceptor".

The "negatively charged multi-layered photoreceptor" generally has a configuration in which an undercoat layer (UCL) made of a resin, and the like is provided on a conductive support such as an aluminum tube, and a charge generation layer (CGL) made of a charge generation material (CGM), a resin, and the like is provided thereon, and a charge transport layer (CTL) made of a hole transport material (HTM), a resin, and the like is further provided thereon.

In the case of such a negatively charged multi-layered photoreceptor, the photoreceptor surface is negatively charged by a corona discharging method or a contact method, and then the photoreceptor is exposed to light. The charge generation material (CGM) absorbs the light to generate charge carriers of holes and electrons, of which the holes, i.e., positive charge carriers, are moved to the charge transport layer (CTL) through the hole transport material (HTM) and reach the photosensitive layer surface to neutralize the surface charge. On the other hand, the electrons, i.e., negative charge carriers, generated in the charge generation material (CGM) pass through the undercoat layer (UCL) to reach the substrate. In this way, in the negatively charged multi-layered photoreceptor, it is the holes that mainly move in the photosensitive layer. Therefore, the photosensitive layer generally contains only a hole transport material as a charge transport material. At this time, when a compound having a small hole transporting ability, such as an electron transport material, is further added, a content of the hole transport material in the photosensitive layer decreases, resulting in deterioration of electrical characteristics. In addition, since a content of a binder resin also decreases, there is also a concern that abrasion resistance may decrease. Therefore, the electron transport material is not contained in the photosensitive layer excluding special cases.

On the other hand, the "positively charged single-layered photoreceptor" generally has a configuration in which an undercoat layer (UCL) made of a resin, and the like is provided on a conductive support such as an aluminum tube, and a single-layer photosensitive layer made of a charge generation material (CGM), a hole transport material (HTM), an electron transport material (ETM), a resin, and the like is provided thereon (see, for example, PTL 1).

In the case of such a positively charged single-layered photoreceptor, the photoreceptor surface is positively charged by a corona discharging method or a contact method, and then the photoreceptor is exposed to light. The charge generation material (CGM) in the vicinity of the photosensitive layer surface absorbs the light to generate charge carriers of holes and electrons, of which the electrons, i.e., negative charge carriers, neutralize the surface charge on the photosensitive layer surface. On the other hand, holes generated in the charge generation material (CGM), i.e., positive charge carriers, pass through the photosensitive layer and the undercoat layer (UCL) to reach the substrate.

In any of the photoreceptors, the surface charge of the photoreceptor is neutralized, an electrostatic latent image is formed by a potential difference with a surrounding surface, and thereafter, the latent image is visualized with a toner (powder colored resin ink), and the toner is transferred to paper or the like and heat-melted and fixed to complete printing.

As described above, the electrophotographic photoreceptor includes a conductive support and a photosensitive layer formed on the conductive support, and further includes a protective layer provided on the photosensitive layer for the purpose of improving abrasion resistance and the like.

For example, PTL 1 discloses that a surface protective layer containing a thermoplastic alcohol-soluble resin as a binder resin and a filler having an average primary particle diameter of 0.1 μm to 3 μm and a density of 3.0 g/$cm^3$ or less is provided as an outermost surface layer on a photosensitive layer.

PTL 2 discloses that a surface protective layer is provided on a front surface side of a photosensitive layer, and the surface protective layer is a cured product obtained by photocuring a composition containing a hindered amine compound, a binder polymerizable compound, and a charge transport agent.

In addition, PTLs 3 and 4 disclose an electrophotographic photoreceptor including a conductive support and a photosensitive layer that contains an enamine-based compound and that is provided on the conductive support, as an electrophotographic photoreceptor including a photosensitive layer that contains a compound having good solubility, high charge mobility, and excellent electrical characteristics.

CITATION LIST

Patent Literature

PTL 1: JP 2014-163984 A

PTL 2: JP 2019-35856 A

PTL 3: JP 2009-20504 A

PTL 4: JP 2010-139649 A

SUMMARY OF INVENTION

Technical Problem

As a result of studies by the present inventors, it has been found that a photoreceptor including a cured resin-based protective layer may have poor electrical characteristics immediately after the protective layer is cured. In addition, it has been found that, in this case, the electrical characteristics are improved by performing a heat treatment. However, due to the heat treatment, it is necessary to introduce a space, a heating device, and the like for a heat treatment step, and thus there are problems that an initial cost is increased and a running cost is also increased.

As a result of further studies conducted by the present inventors, the above problems tend to easily occur in a negatively charged photoreceptor, and in the case of a positively charged photoreceptor, even when a cured resin-based protective layer is provided, the problem that electrical characteristics deteriorate hardly occurs unless a heat treatment is performed.

An object of the present invention is to provide an electrophotographic photoreceptor including a cured resin-based protective layer with good electrical characteristics.

Solution to Problem

The present invention provides an electrophotographic photoreceptor including: a conductive support; and a photosensitive layer and a protective layer containing a cured product obtained by curing a curable compound (also referred to as a "cured resin-based protective layer"), which are sequentially provided on the conductive support. The photoreceptor has a Martens hardness of 255 N/mm$^2$ or more. The photosensitive layer contains at least a hole transport material (HTM), and an energy difference between a HOMO level and a LUMO level of the hole transport material (HTM) is greater than 3.6 eV and 4.0 eV or less.

In addition, the present invention provides an electrophotographic photoreceptor including: a conductive support; and a photosensitive layer and a cured resin-based protective layer containing a cured product obtained by curing a curable compound, which are sequentially provided on the conductive support. The photosensitive layer contains at least a hole transport material (HTM) composed of a compound represented by a formula (I), and an energy difference between a HOMO level and a LUMO level of the hole transport material (HTM) is greater than 3.6 eV and 4.0 eV or less.

Formula (I)

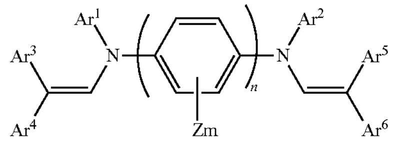

In the formula (I), Ar$^1$ to Ar$^6$ may be same as or different from each other and each represent an aryl group which may have a substituent, n represents an integer of 2 or more, Z represents a monovalent organic residue, and m represents an integer of 0 to 4. At least one of Ar$^1$ and Ar$^2$ is an aryl group having a substituent.

That is, a gist of the present invention lies in the following [1] to [19].

[1] An electrophotographic photoreceptor including:

a conductive support; and a photosensitive layer and a protective layer containing a cured product obtained by curing a curable compound, which are sequentially provided on the conductive support, in which the photoreceptor has a Martens hardness of 255 N/mm$^2$ or more, and the photosensitive layer contains at least a hole transport material (HTM), and an energy difference between a HOMO level and a LUMO level of the hole transport material (HTM) is greater than 3.6 eV and 4.0 eV or less.

[2] The electrophotographic photoreceptor according to [1], in which the energy difference between the HOMO level and the LUMO level of the hole transport material (HTM) is 3.8 eV or less.

[3] The electrophotographic photoreceptor according to [1] or [2], in which the protective layer contains inorganic particles, and a content of the inorganic particles in the protective layer is 10 parts by mass or more and 300 parts by mass or less with respect to 100 parts by mass of the curable compound.

[4] The electrophotographic photoreceptor according to [3], in which the inorganic particles are surface-treated with an organosilicon compound.

[5] The electrophotographic photoreceptor according to [3] or [4], in which the inorganic particles are metal oxide particles, and a band gap of the metal oxide particles is smaller than the energy difference between the HOMO level and the LUMO level of the hole transport material (HTM) in the photosensitive layer.

[6] The electrophotographic photoreceptor according to any one of [1] to [5], in which the curable compound is a photocurable compound.

[7] The electrophotographic photoreceptor according to any one of [1] to [6], in which the protective layer is a layer formed of a composition containing a curable compound, a polymerization initiator, and inorganic particles.

[8] The electrophotographic photoreceptor according to any one of [1] to [7], in which the photosensitive layer is a multi-layered photosensitive layer obtained by laminating a charge generation layer and a charge transport layer in this order on the conductive support.

[9] The electrophotographic photoreceptor according to any one of [1] to [8], in which the Martens hardness is 270 $N/mm^2$ or more.

[10] The electrophotographic photoreceptor according to any one of [1] to [9], in which the hole transport material (HTM) in the photosensitive layer is an enamine compound.

[11] The electrophotographic photoreceptor according to any one of [1] to [10], in which the hole transport material (HTM) in the photosensitive layer is a compound represented by the above formula (I).

[12] The electrophotographic photoreceptor according to any one of [1] to [11], in which the photosensitive layer contains a radical acceptor compound.

[13] The electrophotographic photoreceptor according to [12], in which an energy difference between a HOMO level and a LUMO level of the radical acceptor compound in the photosensitive layer is 3.0 eV or less.

[14] The electrophotographic photoreceptor according to [12] or [13], in which a content of the radical acceptor compound in the photosensitive layer is 0.1 part by mass or more and 10 parts by mass or less with respect to 100 parts by mass of the hole transport material (HTM) in the photosensitive layer.

[15] The electrophotographic photoreceptor according to any one of [1] to [14], in which the electrophotographic photoreceptor is a negatively charged type.

[16] An electrophotographic photoreceptor including:

a conductive support; and a photosensitive layer and a protective layer containing a cured product obtained by curing a curable compound, which are sequentially provided on the conductive support, in which the photosensitive layer contains at least a hole transport material (HTM) composed of a compound represented by the above formula (I), and an energy difference between a HOMO level and a LUMO level of the hole transport material (HTM) is greater than 3.6 eV and 4.0 eV or less.

[17]A method for producing the electrophotographic photoreceptor according to any one of [1] to [16], the method including:

irradiating the protective layer with ultraviolet light and/or visible light to cure the protective layer.

[18]A cartridge including:

the electrophotographic photoreceptor according to any one of [1] to [16].

[19] An image forming device including:

the electrophotographic photoreceptor according to any one of [1] to [16].

Advantageous Effects of Invention

In an electrophotographic photoreceptor including: a conductive support; and a photosensitive layer and a cured resin-based protective layer, which are sequentially provided on the conductive support, when the photosensitive layer contains a hole transport material (HTM) satisfying predetermined conditions, electrical characteristics can be improved. In this case, the hole transport material (HTM) satisfying predetermined conditions means that an energy difference between a HOMO level and a LUMO level of the hole transport material (HTM) is greater than 3.6 eV and 4.0 eV or less, or the hole transport material (HTM) is a compound represented by the above formula (I).

Further, when the photosensitive layer contains the hole transport material (HTM) and a radical acceptor compound, an effect of further improving strong exposure characteristics and ozone resistance can be obtained.

BRIEF DESCRIPTION OF DRAWINGS

FIG. 1 is a diagram schematically showing a configuration example of an image forming device including an electrophotographic photoreceptor according to an embodiment of the present invention.

DESCRIPTION OF EMBODIMENTS

Next, the present invention will be described based on an example of an embodiment. However, the present invention is not limited to the embodiment described below.

<<Present Electrophotographic Photoreceptor>>

An electrophotographic photoreceptor (referred to as "the present electrophotographic photoreceptor" or "the present photoreceptor") according to one example of the embodiment of the present invention is an electrophotographic photoreceptor including: a conductive support; and a photosensitive layer containing at least a predetermined hole transport material (HTM) and a cured resin-based protective layer (also referred to as "the present protective layer") containing a cured product obtained by curing a curable compound, which are sequentially provided on the conductive support.

The present photoreceptor may include any layer other than the photosensitive layer and the present protective layer.

A charging method for the present electrophotographic photoreceptor is any method, and the electrophotographic photoreceptor may be a positively charged electrophotographic photoreceptor or a negatively charged electrophotographic photoreceptor. Among them, from the viewpoint of further obtaining the effects of the present invention, a negatively charged electrophotographic photoreceptor is preferred.

In the present invention, the term "negatively charged electrophotographic photoreceptor" refers to a photoreceptor whose surface is negatively charged, and the term "positively charged electrophotographic photoreceptor" refers to a photoreceptor whose surface is positively charged.

In the photoreceptor according to the present invention, a side opposite to the conductive support is an upper side or a front surface side, and a conductive support side is a lower side or a back surface side.

<Photosensitive Layer>

The photosensitive layer in the present photoreceptor may be a single-layered photosensitive layer with a charge generation material (CGM) and a hole transport material (HTM) in the same layer, or may be a multi-layered photosensitive layer separated into a charge generation layer and a charge transport layer. Among them, a multi-layered photosensitive layer described below is more preferred.

<Multi-Layered Photosensitive Layer>

A preferred example of the multi-layered photosensitive layer in the present photoreceptor include a configuration example in which a charge generation layer and a charge transport layer are laminated in this order on a conductive support. More specific examples thereof include a configuration in which a charge transport layer (CTL) containing a predetermined hole transport material (HTM) is laminated on a charge generation layer (CGL) containing a charge generation material (CGM). In this case, a layer other than the charge generation layer (CGL) and the charge transport layer (CTL) may also be provided.

<Charge Generation Layer (CGL)>

The charge generation layer may contain the charge generation material (CGM) and a binder resin.

From the viewpoint of enhancing ozone resistance, the charge generation layer may further contain a radical acceptor compound to be described later.

(Charge Generation Material (CGM))

Examples of the charge generation material include an inorganic photoconductive material such as selenium, an alloy thereof, and cadmium sulfide, and an organic photoconductive material such as an organic pigment. Among them, an organic photoconductive material is preferred, and an organic pigment is particularly preferred.

Examples of the organic pigment include phthalocyanine, azo, and perylene. Among them, phthalocyanine or azo is particularly preferred. Among them, phthalocyanine is most preferred. Each of these compounds shows a skeleton structure of a compound, and includes a group of compounds having such a skeleton structure, i.e., a derivative.

In the case of using an organic pigment as the charge generation material, the organic pigment is generally used in a form of a dispersion layer in which fine particles thereof are bound with various binder resins.

Specific examples of the phthalocyanine include: metal-free phthalocyanines; those having respective crystal forms of phthalocyanines to which a metal such as copper, indium, gallium, tin, titanium, zinc, vanadium, silicon, germanium, and aluminum, or an oxide, a halide, a hydroxide, and an alkoxide of the above metal is coordinated; and phthalocyanine dimers using an oxygen atom or the like as a cross-linking atom. In particular, X-form and τ-form metal-free phthalocyanines, A-form (also known as B-form), B-form (also known as α-form), and D-form (also known as Y-form) titanyl phthalocyanines (also known as oxytitanium phthalocyanines), vanadyl phthalocyanine, chloroindium phthalocyanine, and hydroxyindium phthalocyanine, II-form chlorogallium phthalocyanine, V-form hydroxygallium phthalocyanine, G-form and I-form μ-oxo-gallium phthalocyanine dimers, and a II-form μ-oxo-aluminum phthalocyanine dimer, which have high sensitivity, are suitable.

Among the phthalocyanines, particularly preferred are A-form (β-form), B-form (α-form), D-form (Y-form) titanyl phthalocyanine characterized by showing a clear peak at a diffraction angle 2θ of 27.1° (±0.2°) or 27.3° (±0.2°) in powder X-ray diffraction, II-form chlorogallium phthalocyanine, V-form and hydroxygallium phthalocyanine characterized by having a strongest peak at a diffraction angle 2θ of 28.1° (±0.2°) in powder X-ray diffraction, hydroxygallium phthalocyanine characterized by having a clear peak at a diffraction angle 2θ of 28.1° (±0.2°) in powder X-ray diffraction without having a peak at 26.2° (±0.2°) and having a half-value width W of 0.1°≤W≤0.4° at a diffraction angle 2θ of 25.9° (±0.2°) in powder X-ray diffraction, G-form μ-oxo-gallium phthalocyanine dimer, and X-form metal-free phthalocyanine.

A single phthalocyanine compound may be used alone, or a mixture of several phthalocyanine compounds or a phthalocyanine compound in a mixed-crystal state may be used. As a mixture of several phthalocyanine compounds or a phthalocyanine compound in a mixed-crystal state here, the respective components may be mixed later, or may be mixed in phthalocyanine compound production and treatment steps such as synthesis, pigmentization, and crystallization. As such a treatment, an acid paste treatment, a grinding treatment, a solvent treatment, and the like are known. In order to generate the phthalocyanine compound in a mixed-crystal state, as described in JP 10-48859 A, a method of mixing two kinds of crystals, mechanically pulverizing and amorphizing the mixture, and then converting the mixture into a specific crystal state by a solvent treatment can be exemplified.

A particle diameter of the charge generation material is generally 1 μm or less, and preferably 0.5 μm or less.

(Binder Resin)

As the binder resin used in the charge generation layer, a known binder resin can be used without particular limitation. Examples thereof include: a polyvinyl acetal-based resin such as a polyvinyl butyral resin, a polyvinyl formal resin, and a partially acetalized polyvinyl butyral resin where butyral is partially modified with formal or acetal; a polyarylate resin, a polycarbonate resin, a polyester resin, a modified ether-based polyester resin, a phenoxy resin, a polyvinyl chloride resin, a polyvinylidene chloride resin, a polyvinyl acetate resin, a polystyrene resin, an acrylic resin, a methacrylic resin, a polyacrylamide resin, a polyamide resin, a polyurethane resin, an epoxy resin, a silicone resin, a polyvinyl alcohol resin, and a polyvinylpyrrolidone resin; a vinyl chloride-vinyl acetate-based copolymer; a styrene-butadiene copolymer, and a vinylidene chloride-acrylonitrile copolymer; an insulating resin such as a styrene-alkyd resin; and an organic photoconductive polymer such as poly-N-vinylcarbazole. Among the resins, a polyvinyl acetal resin or a polyvinyl acetate resin is preferred in terms of pigment dispersibility, adhesion to the conductive support or the undercoat layer, and adhesion to the charge transport layer.

Any one kind of the binder resins may be used alone, or two or more kinds thereof may be mixed and used in any combination.

(Other Components)

The charge generation layer may contain other components, if necessary, in addition to the charge generation material and the binder resin. For example, the charge generation layer may contain additive agents such as an antioxidant, a plasticizer, an ultraviolet absorber, an electron-attracting compound, a leveling agent, a visible light shielding agent, and a filler, which are well known, for the purpose of improving film formability, flexibility, coatability, contamination resistance, gas resistance, light resistance, and the like.

(Blending Ratio)

In the charge generation layer, when a ratio of the charge generation material is too high, stability of a coating liquid may decrease due to aggregation of the charge generation material or the like, and on the other hand, when the ratio of the charge generation material is too low, sensitivity of the photoreceptor may decrease. Therefore, as a blending ratio (mass) of the charge generation material to the binder resin, a content of the charge generation material is preferably 10 parts by mass or more, and more preferably 30 parts by mass or more, and is preferably 1000 parts by mass or less, more preferably 500 parts by mass or less, and from the viewpoint of film strength, even more preferably 300 parts by mass or less, and still more preferably 200 parts by mass or less, with respect to 100 parts by mass of the binder resin.

(Layer Thickness)

A thickness of the charge generation layer is preferably 0.1 μm or more, and more preferably 0.15 μm or more. On the other hand, the thickness is preferably 2.0 μm or less, more preferably 1.0 μm or less, and even more preferably 0.6 μm or less.

<Charge Transport Layer (CTL)>

The charge transport layer (CTL) may contain the hole transport material (HTM) and a binder resin. The charge transport layer may further contain a radical acceptor compound.

(Hole Transport Material (HTM))

The hole transport material (HTM) contained in the photosensitive layer preferably contains a compound whose energy difference between a HOMO level and a LUMO level (also referred to as a "HOMO/LUMO energy level difference") is greater than 3.6 eV and 4.0 eV or less.

As described above, the photoreceptor (referred to as an "OCL photoreceptor") including a cured resin-based protective layer may have poor electrical characteristics immediately after curing.

In contrast, when the photosensitive layer contains, as the hole transport material (HTM), the compound whose HOMO/LUMO energy level difference is greater than 3.6 eV and 4.0 eV or less, the electrical characteristics can be improved.

When forming a cured resin-based protective layer, it is common for curing to proceed due to involvement of a radical from a polymerization initiator or the like. Therefore, the radical also propagates to the hole transport material (HTM) in the photosensitive layer, and an HTM radical is likely to be generated. It is considered that the HTM radical serves as a charge trapping site and deteriorates the electrical characteristics. A reason why the electrical characteristics are improved by a heat treatment is considered to be that the HTM radical is eliminated due to the heat treatment.

Here, it is considered that when the HOMO/LUMO energy level difference is 3.6 eV or less, conjugation tends to spread, and the HTM radical tends to be stable, so that the HTM radical is likely to be generated, and the electrical characteristics are likely to deteriorate. It is considered that when the energy difference is greater than 4.0 eV, hole mobility tends to be low, and thus the electrical characteristics are likely to deteriorate.

On the other hand, the compound whose energy difference is greater than 3.6 eV and 4.0 eV or less has small spread of conjugation, and is considered to have an unstable radical structure. Therefore, when the photosensitive layer contains, as the hole transport material (HTM), the compound whose energy difference is greater than 3.6 eV and 4.0 eV or less, the HTM radical that acts as a charge trapping site is not generated, and thus good electrical characteristics can be obtained even without the heat treatment after the protective layer is cured.

From such a viewpoint, the HOMO/LUMO energy level difference of the hole transport material (HTM) contained in the photosensitive layer is preferably 4.0 eV or less, particularly 4.00 eV or less. Among them, from the viewpoint of the electrical characteristics, the HOMO/LUMO energy level difference is preferably 3.8 eV or less, particularly 3.80 eV or less, and more preferably 3.7 eV or less, particularly 3.70 eV or less. When the energy difference is equal to or less than the upper limit, the conjugation spreads widely, the hole mobility is high, and thus the electrical characteristics are good. On the other hand, from the viewpoint of strong exposure characteristics, the energy difference is preferably greater than 3.6 eV, and more preferably greater than 3.60 eV. Among them, the energy difference is even more preferably greater than 3.62 eV, and still more preferably greater than 3.64 eV. When the energy difference is greater than the lower limit, absorption of light from a fluorescent lamp can be prevented.

Examples of the compound whose HOMO/LUMO energy level difference is greater than 3.6 eV and 4.0 eV or less include heterocyclic compounds such as an enamine derivative, a carbazole derivative, an indole derivative, an imidazole derivative, an oxazole derivative, a pyrazole derivative, a thiadiazole derivative, and a benzofuran derivative, an aniline derivative, a hydrazone derivative, an aromatic amine derivative, a stilbene derivative, a butadiene derivative, and compounds each made of two or more of these compounds bonded together.

Among them, a carbazole derivative, an aromatic amine derivative, a stilbene derivative, a butadiene derivative, or an enamine derivative is preferred, an enamine derivative or a butadiene derivative is more preferred, and an enamine derivative is even more preferred.

Compounds corresponding to the above energy levels (the HOMO level and the LUMO level) can be appropriately selected from these compounds. Two or more kinds of compounds corresponding to the above energy levels can be used in combination.

As the hole transport material (HTM), two or more kinds of compounds such as a compound whose HOMO/LUMO energy level difference is greater than 3.6 eV and 4.0 eV or less and a compound whose HOMO/LUMO energy level difference is 3.6 eV or less or greater than 4.0 eV may be used in combination.

In the present invention, the HOMO energy level (E_homo) and the LUMO energy level (E_lumo) can be obtained by determining a stable structure by structural optimization calculation using B3LYP (see A. D. Becke, J. Chem. Phys. 98, 5648 (1993), C. Lee, et. al., Phys. Rev. B37, 785 (1988), and B. Miehlich, et. al., Chem. Phys. Lett. 157, 200 (1989)), which is a kind of density functional theory method.

At this time, 6-31G (d, p) obtained by adding a polarization function to 6-31G is used as a basis function (see R. Ditchfield, et. al., J. Chem. Phys. 54, 724 (1971), W. J. Hehre, et al., J. Chem. Phys. 56, 2257 (1972), P. C. Hariharan et. al., Mol. Phys. 27, 209 (1974), M. S. Gordon, Chem. Phys. Lett. 76, 163 (1980), P. C. Hariharan et. al., Theo. Chim. Acta 28, 213 (1973), J. -P. Blaudeau, et. al., J. Chem. Phys. 107, 5016 (1997), M. M. Francl, et. al., J. Chem. Phys. 77, 3654 (1982), R. C. Binning, Jr. et. al., J. Comp. Chem. 11, 1206 (1990), V. A. Rassolov, et. al., J. Chem. Phys. 109, 1223 (1998), and V. A. Rassolov, et. al., J. Comp. Chem. 22, 976 (2001)).

In the present invention, the B3LYP calculation using 6-31G (d, p) is described as B3LYP/6-31G (d, p).

In the present invention, a program used for the B3LYP/6-31G (d, p) calculation is Gaussian 03, Revision D. 01 (M. J. Frisch, et. al., Gaussian, Inc., Wallingford CT, 2004.).

The charge transport layer (CTL) and/or the photosensitive layer in the present photoreceptor may also contain the compound whose HOMO/LUMO energy level difference is greater than 3.6 eV and 4.0 eV or less, and the hole transport material (HTM) that does not correspond to the energy level difference, as long as the effects of the present invention are not impaired. From the viewpoint of maintaining the effects of the present invention, a content of the latter compound in the charge transport layer (CTL) and/or the photosensitive layer is preferably less than 100 parts by mass, more preferably less than 80 parts by mass, even more preferably less than 60 parts by mass, still more preferably less than 50 parts by mass, and even still more preferably less than 20 parts by mass, with respect to 100 parts by mass of the former compound.

Suitable examples of the hole transport material (HTM) include a compound represented by the following formula (I). That is, a compound which is represented by the formula (I) and whose HOMO/LUMO energy level difference is greater than 3.6 eV and 4.0 eV or less is suitable as the hole transport material (HTM). The present invention is not limited thereto.

Any one kind of the compounds represented by the formula (I) may be used alone, or two or more kinds thereof may be used in any combination. In the case of using two or more kinds of compounds represented by the formula (I) in combination, the compound whose HOMO/LUMO energy level difference is greater than 3.6 eV and 4.0 eV or less and the compound whose level difference is 3.6 eV or less or greater than 4.0 eV may be used in combination.

The energy level of the compound represented by the formula (I) can be adjusted by selecting a structure of the compound, i.e., $Ar^1$ to $Ar^6$, n, Z, and m.

Formula (I)

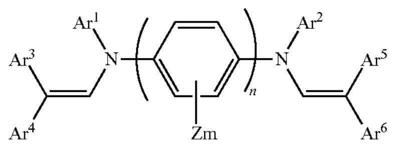

In the formula (I), $Ar^1$ to $Ar^6$ may be same as or different from each other and each represent an aryl group which may have a substituent, n represents an integer of 2 or more, Z represents a monovalent organic residue, and m represents an integer of 0 to 4. At least one of $Ar^1$ and $Ar^2$ is an aryl group having a substituent.

In the above formula (I), $Ar^1$ to $Ar^6$ each represent an aryl group which may have a substituent and may be same as or different from each other. Among them, an aryl group having 6 to 20 carbon atoms is preferred, and an aryl group having 6 to 12 carbon atoms is more preferred. Specific examples thereof include a phenyl group, a naphthyl group, a fluorenyl group, an anthryl group, a phenanthryl group, and a pyrenyl group, and preferred examples thereof include a phenyl group, a naphthyl group, and a fluorenyl group. An aryl group having 6 to 10 carbon atoms such as a phenyl group and a naphthyl group is particularly preferred in terms of production cost. Further, when a substituent is present, it is preferred that the substituent has 1 to 10 carbon atoms and has a substituent constant $\sigma_p$ in Hammett's rule of 0.20 or less.

Here, the Hammett's rule is a rule of thumb used to describe an effect of a substituent in an aromatic compound on an electron state of an aromatic ring, and the substituent constant $\sigma_p$ of a substituted benzene can be said to be a value obtained by quantifying a degree of electron donating/attracting of the substituent. When the $\sigma_p$ value is positive, the substituent is more acidic than non-substituted ones, i.e., is an electron-attractive substituent. Conversely, when the $\sigma_p$ value is negative, the substituent is an electron-donating substituent. Table 1 shows $\sigma_p$ values of representative substituents (edited by the Chemical Society of Japan, "Handbook of Chemistry: Pure Chemistry II Revised 4th Ed.", Maruzen Co., Ltd. published on Sep. 30, 1993, p. 364-365).

TABLE 1

Substituent constant σ in Hammett's rule

| Substituent | $\sigma_p$ |
|---|---|
| —$NMe_2$ | −0.83 |
| —OMe | −0.268 |
| —$^t$Bu | −0.197 |
| —Pr | 0.156 |
| —Et | −0.151 |
| —Me | −0.170 |
| —H (standard) | 0.00 |
| —Ph | 0.01 |
| —β-Naphthyl | 0.062 |
| —CH═$CH_2$ | −0.08 |
| —F | 0.06 |
| —Cl | 0.227 |
| —Br | 0.232 |
| —COMe | 0.491 |
| —$CF_3$ | 0.505 |
| —CN | 0.670 |
| —$NO_2$ | 0.78 |
| —$CO_2$Et | 0.453 |

Examples of such a substituent include an alkyl group having 1 to 10 carbon atoms, an alkoxy group having 1 to 10 carbon atoms, an alkylamino group having 2 to 10 carbon atoms, and an aryl group having 6 to 10 carbon atoms, and specific examples thereof include a methyl group, an ethyl group, an n-propyl group, an isopropyl group, an n-butyl group, an isobutyl group, a tert-butyl group, a methoxy group, an ethoxy group, a propoxy group, a butoxy group, an N,N-dimethylamino group, an N,N-diethylamino group, a phenyl group, a 4-tolyl group, a 4-ethylphenyl group, a 4-propylphenyl group, a 4-butylphenyl group, and a naphthyl group. Among them, an alkyl group having 1 to 4 carbon atoms is preferred, and a methyl group or an ethyl group is particularly preferred, in terms of the electrical characteristics.

In the formula (I), n is generally an integer of 2 or more in terms of improving the electrical characteristics of the present electrophotographic photoreceptor. There is no particular upper limit for n as long as the electrical characteristics are not adversely affected, and n is preferably an integer of 5 or less, and more preferably an integer of 3 or less. Considering comprehensively from the viewpoint of compatibility with the photosensitive layer, production cost, and the like, n is preferably 2 or 3, and n=2 is particularly preferred.

In the formula (I), examples of the monovalent organic residue Z include an alkyl group having 1 to 4 carbon atoms, an alkoxy group having 1 to 4 carbon atoms, an alkylamino group having 2 to 4 carbon atoms, and an aryl group having 6 to 10 carbon atoms, and specific examples thereof include methyl, ethyl, n-propyl, isopropyl, n-butyl, isobutyl, tert-butyl, methoxy, ethoxy, propoxy, butoxy, N,N-dimethylamino, N,N-diethylamino, phenyl, 4-tolyl, 4-ethylphenyl, 4-propylphenyl, 4-butylphenyl, and naphthyl. Among them, an alkyl group having 1 to 4 carbon atoms is particularly preferred in terms of the electrical characteristics.

In the above formula (I), m is preferably an integer of 0 and 1, and m=0 is particularly preferred from the viewpoint of the production cost.

(Radical Acceptor Compound)

The charge transport layer (CTL) of the present electrophotographic photoreceptor may further contain the radical acceptor compound, if necessary.

In the present invention, the term "radical acceptor compound" means a compound having a property of being able to accept a radical from the hole transport material (HTM), more specifically, a compound having an electron affinity of 3.5 eV or more.

Here, the electron affinity means energy generated when a certain substance absorbs one electron, and can be obtained by determining a stable structure by structural optimization calculation using B3LYP (see A. D. Becke, J. Chem. Phys. 98, 5648 (1993), C. Lee, et. al., Phys. Rev. B37, 785 (1988) and B. Miehlich, et. al., Chem. Phys. Lett. 157, 200 (1989)), which is a kind of the density functional theory method described above. In determining the electron affinity, a basis function and a program used for calculation can be the same as those described above.

When the charge transport layer (CTL) of the present electrophotographic photoreceptor contains the radical acceptor compound, the strong exposure characteristics and ozone resistance can be further improved. That is, a decrease in performance when the present photoreceptor is exposed to light such as a fluorescent lamp can further be prevented (strong exposure characteristics), and a decrease in performance when the present photoreceptor is exposed to an ozone atmosphere can be further prevented (ozone resistance).

A reason for this is not clear, but as for the strong exposure characteristics, as described above, the HTM within the scope of the present invention is less likely to be radicalized because the radical structure is unstable. Even so, there is a possibility that a few of HTM radicals are present. It is considered that the strong exposure characteristics deteriorate because the radicals are easily decomposed by strong exposure. It is considered that when the radical acceptor compound is contained, the radical acceptor compound is more likely to be radicalized than the HTM, and therefore, even when there are a few of HTM radicals, the radicals are transferred to the radical acceptor compound, and the HTM is not in a radical state. Therefore, it is considered that the charge trapping site is eliminated and the strong exposure characteristics are further improved.

On the other hand, the ozone resistance is particularly effective after a certain period of time has elapsed from exposure to an ozone atmosphere (for example, after two days of exposure). This is because ozone reaches the charge generation layer from the photoreceptor surface after a certain period of time and deteriorates the charge generation material (CGM). It is presumed that when the radical acceptor compound is contained, the radical acceptor compound is easily oxidized by ozone, so that ozone is consumed before the ozone reaches the charge generation layer, and as a result, the deterioration of CGM can be prevented. It is considered that the radical acceptor compound oxidized by ozone does not adversely affect the electrical characteristics.

Among them, the hole transport material (HTM) and the radical acceptor compound are dispersed and present in the same layer, so that the strong exposure characteristics can be further enhanced.

When the photosensitive layer contains an electron transport material (ETM) to be described later, the ETM is more likely to be radicalized than the HTM, so that even when an HTM radical is generated, the HTM radical immediately extracts a hydrogen atom from the ETM and is converted into the HTM, whereby the strong exposure characteristics and the ozone resistance can be further improved. Considering the action mechanism, all the electron transport materials (ETM) are encompassed by the "radical acceptor compound", and it is considered that even when the electron transport material (ETM) is used, the effect of improving the strong exposure characteristics and the ozone resistance can be further obtained due to the action mechanism same as that of the radical acceptor compound.

The radical acceptor compound that can be used in the present electrophotographic photoreceptor is preferably a compound whose energy difference between a HOMO level and a LUMO level is 3.0 eV or less, particularly 3.00 eV or less.

It is preferred that the energy difference of the radical acceptor compound is 3.0 eV or less since ability to shield ultraviolet light is high.

From such a viewpoint, the energy difference between the HOMO level and the LUMO level of the radical acceptor compound is preferably 3.0 eV or less, particularly 3.00 eV or less, more preferably 2.8 eV or less, particularly 2.80 eV or less, and even more preferably 2.6 eV or less, particularly 2.60 eV or less.

The lower limit of the energy difference of the radical acceptor compound is preferably 2.0 eV or more, particularly 2.00 eV or more, more preferably 2.1 eV or more, particularly 2.10 eV or more, and even more preferably 2.2 eV or more, particularly 2.20 eV or more, from the viewpoint of transparency to exposure light.

The electron affinity of the radical acceptor compound is preferably 3.5 eV or more, particularly 3.50 eV or more, more preferably 3.7 eV or more, particularly 3.70 eV or more, and even more preferably 3.8 eV or more, particularly 3.80 eV or more, since the effects of the present invention can be further obtained. On the other hand, the electron affinity of the radical acceptor compound is preferably 4.3 eV or less, particularly 4.30 eV or less, more preferably 4.1 eV or less, particularly 4.10 eV or less, even more preferably 4.0 eV or less, particularly 4.00 eV or less, and particularly preferably 3.9 eV or less, particularly 3.90 eV or less.

Preferred embodiments of the radical acceptor compound can similarly be applied to preferred embodiments of the electron transport material (ETM) to be described later.

The radical acceptor compound can be selected from the electron transport material (ETM) to be described later. Compounds other than the compounds exemplified as the electron transport material (ETM) can also be used. Further, the compounds exemplified as the electron transport material (ETM) can be used in combination with other compounds.

A content of the radical acceptor compound in the photosensitive layer of the present electrophotographic photoreceptor is preferably 0.1 part by mass or more, more preferably 0.3 part by mass or more, and even more preferably 0.5 part by mass or more, with respect to 100 parts by mass of the hole transport material (HTM) in the photosensitive layer. On the other hand, the content is preferably 10 parts by mass or less, more preferably 7 parts by mass or less, and even more preferably 5 parts by mass or less, with respect to 100 parts by mass of the hole transport material (HTM) in the photosensitive layer.

A content proportion of the hole transport material (HTM) to the radical acceptor compound in the photoreceptor is the same as the content proportion of the hole transport material (HTM) to the radical acceptor compound in the photosensitive layer described above.

A content proportion of the hole transport material (HTM) to the radical acceptor compound in the charge transport layer (CTL) is the same as the content proportion of the hole transport material (HTM) to the radical acceptor compound in the photosensitive layer described above. [0071](Electron Transport Material (ETM)) As described above, when the charge transport layer (CTL) and/or the photosensitive layer in the present photoreceptor contain the hole transport material (HTM) and an electron transport material (ETM), the strong exposure characteristics and the ozone resistance can be further improved.

The electron transport material (ETM) that can be used in the present photoreceptor is preferably a compound whose energy difference between a HOMO level and a LUMO level is 3.0 eV or less, particularly 3.00 eV or less.

It is preferred that the energy difference of the ETM is 3.0 eV or less since ability to shield ultraviolet light is high.

From such a viewpoint, the energy difference between the HOMO level and the LUMO level of the electron transport material (ETM) is preferably 3.0 eV or less, particularly 3.00 eV or less, more preferably 2.8 eV or less, particularly 2.80 eV or less, and even more preferably 2.6 eV or less, particularly 2.60 eV or less.

The lower limit of the energy difference of the electron transport material (ETM) is preferably 2.0 eV or more, particularly 2.00 eV or more, more preferably 2.1 eV or more, particularly 2.10 eV or more, and even more preferably 2.2 eV or more, particularly 2.20 eV or more, from the viewpoint of transparency to exposure light.

Examples of the electron transport material (ETM) that can be used in the present photoreceptor include electron-attracting materials such as aromatic nitro compounds such as 2,4,7-trinitrofluorenone, cyano compounds such as tetracyanoquinodimethane, and quinone compounds such as diphenoquinone and dinaphthylquinone, and compounds each made of two or more of these compounds bonded together or polymers each having, in a main chain or a side chain thereof, a group constituted of any one of these compounds. The present invention is not limited thereto, and known electron transport materials can be used.

Among them, from the viewpoint of the electrical characteristics, the electron transport material (ETM) is preferably a compound having a diphenoquinone structure or a dinaphthylquinone structure. Among them, a compound having a dinaphthylquinone structure is more preferred.

Any one kind of the above electron transport materials may be used alone, or two or more kinds thereof may be used in any combination.

Specific examples of the electron transport material (ETM) that can be used in the present photoreceptor include compounds represented by general formulae (ET1) to (ET3) illustrated in paragraphs 0043 to 0053 in JP 2017-09765 A.

Specific examples of the electron transport material (ETM) include compounds each having any one of structures shown below.

The present invention is not limited thereto. Any one kind of the electron transport materials may be used alone, or two or more kinds thereof may be used in any combination.

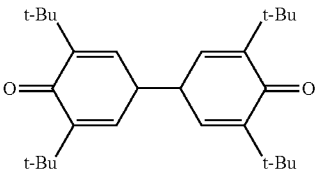

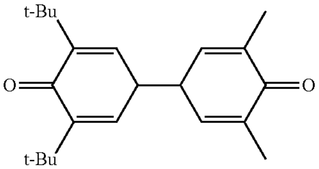

-continued

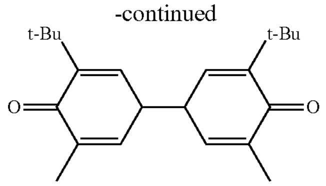

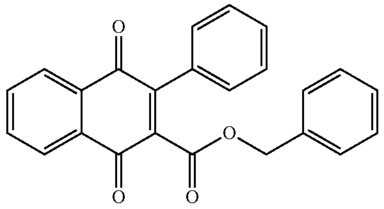

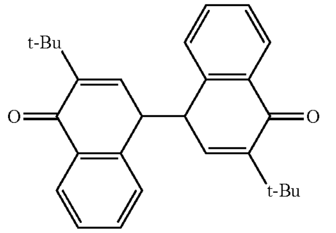

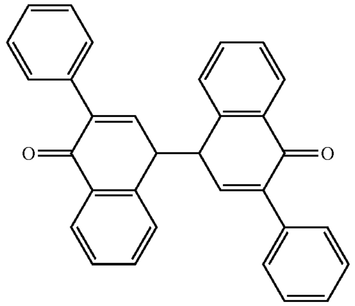

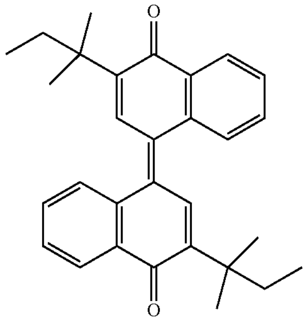

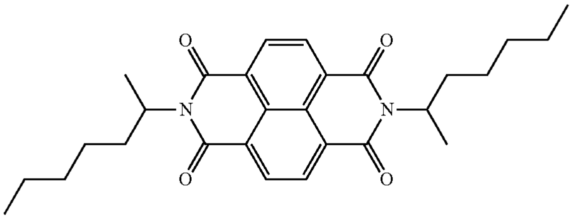

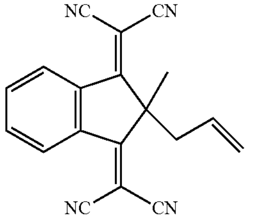

A content of the electron transport material (ETM) in the present photosensitive layer is preferably 0.1 part by mass or more, more preferably 0.3 part by mass or more, and even more preferably 0.5 part by mass or more, with respect to 100 parts by mass of the hole transport material (HTM) in the photosensitive layer. On the other hand, the content is preferably 10 parts by mass or less, more preferably 7 parts by mass or less, and even more preferably 5 parts by mass or less, with respect to 100 parts by mass of the hole transport material (HTM) in the photosensitive layer.

A content proportion of the hole transport material (HTM) to the electron transport material (ETM) in the photoreceptor is the same as the content proportion of the hole transport material (HTM) to the electron transport material (ETM) in the photosensitive layer described above.

A content proportion of the hole transport material (HTM) to the electron transport material (ETM) in the charge transport layer (CTL) is the same as the content proportion of the hole transport material (HTM) to the electron transport material (ETM) in the photosensitive layer described above.

(Binder Resin)

Examples of the binder resin in the charge transport layer include thermoplastic resins and various thermosetting compounds such as polymethyl methacrylate, polystyrene, vinyl polymers such as polyvinyl chloride and copolymers thereof, polycarbonates, polyarylates, polyesters, polyester polycarbonates, polysulfones, phenoxy, epoxy, and a silicone resin. Among the resins, a polycarbonate resin or a polyarylate resin is preferred in terms of light attenuation characteristics and mechanical strength of the photoreceptor.

The binder resin has a viscosity average molecular weight (Mv) of generally 5,000 to 300,000, preferably 10,000 or more or 200,000 or less, more preferably 15,000 or more or 150,000 or less, and even more preferably 20,000 or more or 80,000 or less. When the viscosity average molecular weight (Mv) is excessively small, the mechanical strength tends to decrease when the binder resin is obtained as a film for forming a photoreceptor. On the other hand, when the viscosity average molecular weight (Mv) is excessively large, the viscosity of the coating liquid increases, and it tends to be difficult to apply the coating liquid to have an appropriate film thickness.

As for a blending proportion of the hole transport material (HTM) to the binder resin constituting the photosensitive layer, the hole transport material (HTM) is generally blended in a proportion of 20 parts by mass or more with respect to 100 parts by mass of the binder resin. Among them, with respect to 100 parts by mass of the binder resin, the hole transport material (HTM) is preferably blended in a proportion of 30 parts by mass or more from the viewpoint of reducing a residual potential, and the hole transport material (HTM) is more preferably blended in a proportion of 40 parts by mass or more from the viewpoint of stability and charge mobility during repeated use. On the other hand, with respect to 100 parts by mass of the binder resin, the hole transport material (HTM) is preferably blended in a proportion of 200 parts by mass or less from the viewpoint of thermal stability of the photosensitive layer, the hole transport material (HTM) is more preferably blended in a proportion of 150 parts by mass or less from the viewpoint of compatibility between the hole transport material (HTM) and the binder resin, and the hole transport material (HTM) is particularly preferably blended in a proportion of 120 parts by mass or less from the viewpoint of a glass transition temperature. When the hole transport material (HTM) is blended in a proportion of 120 parts by mass or less, the glass transition temperature of the photosensitive layer increases, and an improvement in leak resistance can be expected.

A blending proportion of the hole transport material (HTM) to the binder resin in the charge transport layer is the same as the blending proportion of the hole transport material (HTM) to the binder resin in the photosensitive layer described above.

As for a content proportion of the hole transport material (HTM) to a total mass of the photosensitive layer, the hole transport material (HTM) is generally blended in a proportion of 16 parts by mass or more with respect to 100 parts by mass of the photosensitive layer. Among them, with respect to 100 parts by mass of the photosensitive layer, the hole transport material (HTM) is preferably blended in a proportion of 22 parts by mass or more from the viewpoint of reducing the residual potential, and further the hole transport material (HTM) is more preferably blended in a proportion of 28 parts by mass or more from the viewpoint of stability and charge mobility during repeated use. On the other hand, with respect to 100 parts by mass of the photosensitive layer, the hole transport material (HTM) is preferably blended in a proportion of 68 parts by mass or less from the viewpoint of the thermal stability of the photosensitive layer, the hole transport material (HTM) is more preferably blended in a proportion of 59 parts by mass or less from the viewpoint of uniformity of the photosensitive layer, and the hole transport material (HTM) is particularly preferably blended in a proportion of 53 parts by mass or less from the viewpoint of the glass transition temperature. When the hole transport material (HTM) is blended in a proportion of 53 parts by mass or less, the glass transition temperature of the photosensitive layer increases, and an improvement in leak resistance can be expected.

As for the blending proportion of the hole transport material (HTM) to the binder resin in the charge transport layer (CTL), the hole transport material (HTM) is preferably blended in a proportion of 20 parts by mass or more with respect to 100 parts by mass of the binder resin. Among them, with respect to 100 parts by mass of the binder resin, the hole transport material (HTM) is more preferably blended in a proportion of 30 parts by mass or more from the viewpoint of reducing a residual potential, and the hole transport material (HTM) is even more preferably blended in a proportion of 40 parts by mass or more from the viewpoint of stability and charge mobility during repeated use. On the other hand, with respect to 100 parts by mass of the binder resin, the hole transport material (HTM) is preferably blended in a proportion of 200 parts by mass or less from the viewpoint of thermal stability of the photosensitive layer, the hole transport material (HTM) is more preferably blended in a proportion of 150 parts by mass or less from the viewpoint of compatibility between the hole transport material (HTM) and the binder resin, and the hole transport material (HTM) is particularly preferably blended in a proportion of 120 parts by mass or less from the viewpoint of the glass transition temperature. When the hole transport material (HTM) is blended in a proportion of 120 parts by mass or less, the glass transition temperature of the photosensitive layer increases, and an improvement in leak resistance can be expected.

(Other Components)

The charge transport layer may contain other components, if necessary, in addition to the hole transport material (HTM), the electron transport material (ETM), and the binder resin. For example, the charge transport layer may contain additive agents such as an antioxidant, a plasticizer, an ultraviolet absorber, an electron-attracting compound, a leveling agent, a visible light shielding agent, and a filler, which are well known, for the purpose of improving film formability, flexibility, coatability, contamination resistance, gas resistance, light resistance, and the like.

(Layer Thickness)

A layer thickness of the charge transport layer is not particularly limited. From the viewpoint of the electrical characteristics, image stability, and high resolution, the layer thickness is preferably 5 μm or more or 50 μm or less, more preferably 10 μm or more or 35 μm or less, and even more preferably 15 μm or more or 25 μm or less.

<Single-layered Photosensitive Layer>

Examples of the single-layered photosensitive layer in the present photoreceptor include a configuration in which a charge generation material (CGM) and a hole transport material (HTM) are present in the same layer. The single-layered photosensitive layer may further contain a radical acceptor compound or an electron transport material (ETM).

The charge generation material (CGM), the hole transport material (HTM), the radical acceptor compound, and the electron transport material (ETM) in the single-layered photosensitive layer can be the same as those in the multi-layered photosensitive layer. In addition, contents and content proportions of the respective components in the single-layered photosensitive layer are also the same as those in the multi-layered photosensitive layer.

(Method for Forming Each Layer)

Each of the above layers can be formed by applying a coating liquid, which is obtained by dissolving or dispersing materials to be contained in a solvent or dispersion medium, onto a conductive support by a known method such as dip coating, spray coating, nozzle coating, bar coating, roll coating, and blade coating, and sequentially repeating a coating and drying step for each layer. The present invention is not limited to such a forming method.

The solvent or dispersion medium used for preparing the coating liquid is not particularly limited. Specific examples thereof include: alcohols such as methanol, ethanol, propanol, and 2-methoxyethanol; ethers such as tetrahydrofuran, 1,4-dioxane, and dimethoxyethane; esters such as methyl formate and ethyl acetate; ketones such as acetone, methyl ethyl ketone, cyclohexanone, and 4-methoxy-4-methyl-2-pentanone; aromatic hydrocarbons such as benzene, toluene, and xylene; chlorinated hydrocarbons such as dichloromethane, chloroform, 1,2-dichloroethane, 1,1,2-trichloroethane, 1,1,1-trichloroethane, tetrachloroethane, 1,2-dichloropropane, and trichloroethylene; nitrogen-containing compounds such as n-butylamine, isopropanolamine, diethylamine, triethanolamine, ethylenediamine, and triethylenediamine; and aprotic polar solvents such as acetonitrile, N-methylpyrrolidone, N,N-dimethylformamide, and dimethylsulfoxide. These may be used alone or in any combination of two or more kinds thereof.

An amount of the solvent or dispersion medium to be used is not particularly limited. Considering the purpose of each layer and the properties of the selected solvent and dispersion medium, it is preferred to appropriately adjust the amount such that physical properties such as a solid content concentration and viscosity of the coating liquid fall within desired ranges.

A coating film is preferably dried by heating in a temperature range of generally 30° C. or higher and 200° C. or lower for 1 minute to 2 hours with or without an air stream after finger touch drying at room temperature. The heating temperature may be constant, or heating may be performed while changing a temperature during drying.

<Present Protective Layer>

The present protective layer is preferably a layer containing a cured product obtained by curing a curable compound.

The present protective layer can be formed of a composition containing a curable compound and a polymerization initiator. Among them, it is preferred to form the present protective layer by thermally curing or photocuring a curable composition containing a curable compound, a polymerization initiator, and inorganic particles, and it is more preferred to form the present protective layer by photocuring a photocurable compound that can be photocured.

(Curable Composition)

Examples of the curable composition include a composition containing a curable compound, a polymerization initiator, inorganic particles, and, if necessary, other materials.

(Curable Compound)

As the curable compound, a monomer, an oligomer, or a polymer having a radically polymerizable functional group is preferred. Among them, a curable compound having crosslinkability, particularly a photocurable compound, is preferred. Examples thereof include a curable compound having two or more radically polymerizable functional groups. A compound having one radically polymerizable functional group may be used in combination.

Examples of the radically polymerizable functional group include a vinyl group, an acryloyl group, a methacryloyl group, an acryloyloxy group, a methacryloyloxy group, and an epoxy group.

Preferred examples of the curable compound having a radically polymerizable functional group are shown below. Examples of the monomer having an acryloyl group or a methacryloyl group include trimethylolpropane triacrylate (TMPTA), trimethylolpropane trimethacrylate, HPA-modified trimethylolpropane triacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate, glycerol triacrylate, ECH-modified glycerol triacrylate, EO-modified glycerol triacrylate, PO-modified glycerol triacrylate, tris(acryloxyethyl) isocyanurate, caprolactone-modified tris(acryloxyethyl) isocyanurate, EO-modified tris (acryloxyethyl) isocyanurate, PO-modified tris (acryloxyethyl) isocyanurate, dipentaerythritol hexaacrylate, caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate, pentaerythritol ethoxytetraacrylate, EO-modified phosphoric acid triacrylate, 2,2,5,5,-tetrahydroxymethylcyclopentanone tetraacrylate, 2-hydroxy-3-acryloyloxypropyl methacrylate, polyethylene glycol diacrylate, polypropylene glycol diacrylate, polytetramethylene glycol diacrylate, EO-modified bisphenol A diacrylate, PO-modified bisphenol A diacrylate, 9,9-bis[4-(2-acryloyloxyethoxy)phenyl]fluorene, tricyclodecanedimethanol diacrylate, decanediol diacrylate, hexanediol diacrylate, ethylene glycol dimethacrylate, polyethylene glycol dimethacrylate, EO-modified bisphenol A dimethacrylate, PO-modified bisphenol A dimethacrylate, tricyclodecanedimethanol dimethacrylate, decanediol dimethacrylate, and hexanediol dimethacrylate.

Examples of the oligomer or polymer having an acryloyl group or a methacryloyl group include a urethane acrylate, an ester acrylate, an acrylic acrylate, and an epoxy acrylate. Among them, a urethane acrylate or an ester acrylate is preferred, and a urethane acrylate is more preferred.

The above compounds can be used alone or in combination of two or more kinds thereof.

(Polymerization Initiator)

Examples of the polymerization initiator include a thermal polymerization initiator and a photopolymerization initiator.

Examples of the thermal polymerization initiator include: peroxide-based compounds such as 2,5-dimethylhexane-2,5-dihydroperoxide, dicumyl peroxide, benzoyl peroxide, t-butyl peroxide, t-butyl cumyl peroxide, t-butyl hydroperoxide, cumene hydroperoxide, and lauroyl peroxide; and azo-based compounds such as 2,2'-azobis(isobutyronitrile), 2,2'-azobis(2-methylbutyronitrile), 2,2'-azobis(2,4-dimethylvaleronitrile), 2,2'-azobis(cyclohexanecarbonitrile), 2,2'-azobis(methyl isobutyrate), 2,2'-azobis(isobutylamidine hydrochloride), and 4,4'-azobis-4-cyanovaleric acid.

The photopolymerization initiator can be classified into a direct cleavage type and a hydrogen abstraction type depending on a difference in a radical generation mechanism. The direct cleavage type photopolymerization initiator generates a radical by partly cleaving a covalent bond in one molecule thereof upon absorption of light energy. On the other hand, in the hydrogen abstraction type photopolymerization initiator, a molecule in a state of being excited by absorbing light energy abstracts hydrogen from a hydrogen donor to generate a radical.

Examples of the direct cleavage type photopolymerization initiator include: acetophenone-based or ketal-based compounds such as acetophenone, 2-benzoyl-2-propanol, 1-benzoylcyclohexanol, 2,2-diethoxyacetophenone, benzyldimethylketal, and 2-methyl-4'-(methylthio)-2-morpholinopropiophenone; benzoin ether-based compounds such as benzoin, benzoin methyl ether, benzoin ethyl ether, benzoin isobutyl ether, benzoin isopropyl ether, and O-tosyl benzoin; and acylphosphine oxide-based compounds such as diphenyl(2,4,6-trimethylbenzoyl)phosphine oxide, phenylbis(2,4,6-trimethylbenzoyl)phosphine oxide, and lithium phenyl(2,4,6-trimethylbenzoyl)phosphonate.

Examples of the hydrogen abstraction type photopolymerization initiator include: benzophenone-based compounds such as benzophenone, 4-benzoylbenzoic acid, 2-benzoylbenzoic acid, methyl 2-benzoylbenzoate, methyl benzoylformate, benzyl, p-anisyl, 2-benzoylnaphthalene, 4,4'-bis(dimethylamino)benzophenone, 4,4'-dichlorobenzophenone, and 1,4-dibenzoylbenzene; and anthraquinone-based or thioxanthone-based compounds such as 2-ethylanthraquinone, 2-isopropylthioxanthone, 2-chlorothioxanthone, 2,4-dimethylthioxanthone, 2,4-diethylthioxanthone, and 2,4-dichlorothioxanthone. Examples of other photopolymerization initiators include camphorquinone, 1-phenyl-1,2-propanedione-2-(o-ethoxycarbonyl)oxime, acridine-based compounds, triazine-based compounds, and imidazole-based compounds.

The photopolymerization initiator preferably has an absorption wavelength in a wavelength region of a light source used for light emission in order to efficiently absorb light energy to generate a radical. On the other hand, when a component other than the photopolymerization initiator among the compounds contained in the outermost layer has absorption in the wavelength region, the photopolymerization initiator may not absorb sufficient light energy, and the radical generation efficiency may decrease. Since general binder resins, charge transport materials, and metal oxide particles have an absorption wavelength in an ultraviolet region (UV), this effect is particularly remarkable when the light source used for light emission is ultraviolet light (UV). From the viewpoint of preventing such a problem, it is preferred to contain an acylphosphine oxide-based compound, which has an absorption wavelength on a relatively long wavelength side, among the photopolymerization initiator. Since the acylphosphine oxide-based compound has a photo-bleaching effect in which the absorption wavelength region is changed to a low wavelength side due to self-cleavage, the acylphosphine oxide-based compound can transmit light to the inside of the outermost layer, and is also preferred from the viewpoint of good internal curability. In this case, from the viewpoint of supplementing the curability of the outermost layer surface, it is more preferred to use a hydrogen abstraction type initiator in combination.

A content proportion of the hydrogen abstraction type initiator to the acylphosphine oxide-based compound is not particularly limited. A content of the hydrogen abstraction type initiator, with respect to 1 part by mass of the acylphosphine oxide-based compound, is preferably 0.1 part by mass or more from the viewpoint of supplementing the surface curability, and is preferably 5 parts by mass or less from the viewpoint of maintaining the internal curability.

In addition, a compound having a photopolymerization accelerating effect may be used alone or in combination with the photopolymerization initiator. Examples thereof include triethanolamine, methyldiethanolamine, ethyl 4-dimethylaminobenzoate, isoamyl 4-dimethylaminobenzoate, (2-dimethylamino)ethyl benzoate, and 4,4'-dimethylaminobenzophenone.

The polymerization initiator may be used alone or in combination of two or more kinds thereof. A content of the polymerization initiator is preferably 0.5 part by mass to 40 parts by mass, and more preferably 1 part by mass or more or 20 parts by mass or less, with respect to 100 parts by mass of the radically polymerizable curable composition.

(Inorganic Particles)

The present protective layer preferably contains inorganic particles, if necessary. The inorganic particles are not necessarily contained.

When the present protective layer contains the inorganic particles, not only charge transportability can be enhanced, but also abrasion resistance can be enhanced by increasing the hardness. Further, when the present protective layer is photocured, an effect of preventing photo-deterioration of the photosensitive layer can be obtained.

The inorganic particles are preferably metal oxide particles from the viewpoint of imparting charge transporting ability and improving mechanical strength.

As the metal oxide particles, any metal oxide particles that can be generally used in an electrophotographic photoreceptor can be used. Specific examples of the metal oxide particles include metal oxide particles containing one metal element such as titanium oxide, tin oxide, aluminum oxide, silicon oxide, zirconium oxide, zinc oxide, and iron oxide, and metal oxide particles containing a plurality of metal elements such as calcium titanate, strontium titanate, and barium titanate. As for the metal oxide particles, only one kind of particles may be used, or a plurality of kinds of particles may be mixed and used.

Among them, metal oxide particles having a band gap smaller than the energy difference between the HOMO level and the LUMO level of the HTM in the photosensitive layer are preferred as the inorganic particles from the viewpoint of the strong exposure characteristics. Here, when a plurality of kinds of HTMs are used in the photosensitive layer, the energy difference of the HTM whose energy difference between the HOMO level and the LUMO level is smaller is used as a reference within the range defined by the present invention. When the band gap of the metal oxide particles is smaller than the energy difference, a wavelength absorbed by the hole transport material (HTM) can be cut according to an addition amount, and thus the strong exposure characteristics are improved. From such a viewpoint, metal oxide particles such as titanium oxide, zinc oxide, tin oxide, calcium titanate, strontium titanate, and barium titanate are preferred. Among them, titanium oxide, tin oxide, or zinc oxide is more preferred, and titanium oxide particles are particularly preferred.

As a crystal form of the titanium oxide particles, any one of rutile, anatase, brookite, and amorphous can be used. In addition, from the titanium oxide particles of different crystal states, titanium oxide particles of a plurality of crystal states may be contained.

The surface of the metal oxide particles may be subjected to various surface treatments. For example, the metal oxide particles may be treated with an inorganic compound such as tin oxide, aluminum oxide, antimony oxide, zirconium oxide, and silicon oxide, or with an organic compound such as stearic acid, a polyol, and an organosilicon compound. In particular, when titanium oxide particles are used, they are preferably surface-treated with an organosilicon compound.

Examples of the organosilicon compound include: silicone oils such as dimethylpolysiloxane and methylhydrogenpolysiloxane; organosilanes such as methyldimethoxysilane and diphenyldidimethoxysilane; silazanes such as hexamethyldisilazane; and silane coupling agents such as 3-methacryloyloxypropyltrimethoxysilane, 3-acryloyloxypropyltrimethoxysilane, vinyltrimethoxysilane, γ-mercaptopropyltrimethoxysilane, and γ-aminopropyltriethoxysilane. In particular, 3-methacryloyloxypropyltrimethoxysilane, 3-acryloyloxypropyltrimethoxysilane, or vinyltrimethoxysilane having a chain polymerizable functional group is preferred from the viewpoint of improving the mechanical strength of the outermost layer.

The metal oxide particles may be previously treated with an insulating material such as aluminum oxide, silicon oxide, or zirconium oxide before the outermost surface is treated with such a treatment agent.

As for the inorganic particles, only one kind of particles may be used, or a plurality of kinds of particles may be mixed and used.

The inorganic particles having an average primary particle diameter of 500 nm or less are preferably used, the inorganic particles having an average primary particle diameter of 1 nm to 100 nm are more preferably used, and the inorganic particles having an average primary particle diameter of 5 nm to 50 nm are even more preferably used.

The average primary particle diameter can be obtained based on an arithmetic average value of particle diameters directly observed with a transmission electron microscope (hereinafter also referred to as TEM).

A content of the inorganic particles in the present protective layer is not particularly limited. For example, from the viewpoint of the electrical characteristics, with respect to 100 parts by mass of the curable compound, the content is preferably 10 parts by mass or more, more preferably 20 parts by mass or more, and particularly preferably 30 parts by mass or more. From the viewpoint of maintaining good surface resistance, the content is preferably 300 parts by mass or less, more preferably 200 parts by mass or less, and particularly preferably 100 parts by mass or less.

(Other Materials)

The present protective layer may contain other materials, if necessary. Examples of the other materials include a stabilizer (such as a heat stabilizer, an ultraviolet absorber, a light stabilizer, and an antioxidant), a dispersant, an antistatic agent, a colorant, and a lubricant. These may be used alone or in any combination of two or more kinds thereof in any ratio as appropriate.

(Curing Method)

As a curing method, any method such as thermal curing, photocuring, electron beam curing, and radiation curing can be used, and photocuring which is excellent in safety and energy saving is preferred. Among photocuring, preferred is curing by ultraviolet light and/or visible light, particularly curing by metal halide light and LED light, and more preferred is curing by LED light, in which the reaction can be controlled and heat generation can be prevented. From the viewpoint of a curing rate, a wavelength of the LED light is preferably 400 nm or less, and more preferably 385 nm or less.

(Martens Hardness)

The Martens hardness of the present photoreceptor is preferably 255 $N/mm^2$ or more. Among them, the Martens hardness is more preferably 270 $N/mm^2$ or more, 300 $N/mm^2$ or more, 320 $N/mm^2$ or more, and 330 $N/mm^2$ or more. When the Martens hardness is 255 $N/mm^2$ or more, practically sufficient abrasion resistance can be provided.

On the other hand, from the viewpoint of preventing crack generation, the Martens hardness of the present photoreceptor is preferably 500 $N/mm^2$ or less, more preferably 400 $N/mm^2$ or less, and even more preferably 350 $N/mm^2$ or less.

In the present invention, the Martens hardness of the photoreceptor means a Martens hardness measured from a front surface side of the photoreceptor.

The Martens hardness can be measured by a method described in Examples below.

(Elastic Deformation Ratio)

When the present protective layer is provided, the elastic deformation ratio of the present photoreceptor can be 40% or more, particularly 45% or more, and more particularly 50% or more. When the elastic deformation ratio is 40% or more, practically sufficient abrasion resistance and cleaning resistance can be provided.

In the present invention, the elastic deformation ratio of the photoreceptor means an elastic deformation ratio measured from the front surface side of the photoreceptor.

The elastic deformation ratio can be measured by a method same as that for the Martens hardness.

(Method for Forming Present Protective Layer)

The present protective layer can be formed by, for example, applying a coating liquid obtained by dissolving a curable composition containing a curable compound, a polymerization initiator, and, if necessary, inorganic particles in a solvent, if necessary, or a coating liquid obtained by dispersing a curable composition containing a curable compound, a polymerization initiator, and, if necessary, inorganic particles in a dispersion medium, and then curing the coating liquid.

At this time, as an organic solvent used for forming the present protective layer, a known organic solvent may be appropriately selected and used. Among them, it is preferred to contain alcohols having low solubility in polycarbonates and polyarylates that are suitably used in the photosensitive layer.

Examples of a coating method for forming the present protective layer include spray coating, spiral coating, ring coating, and dip coating. The present invention is not limited to these methods.

It is preferred that after a coating film is formed by the above coating method, the coating film is dried.

Curing of the curable composition can be performed by irradiating the curable composition with external energy such as heat, light (for example, ultraviolet light and/or visible light), or radiation. Among them, curing by light irradiation is preferred.

Heat energy can be applied by heating from a coating surface side or a support side using gas such as air and nitrogen, steam, various heat media, infrared rays, or electromagnetic waves. A heating temperature is preferably 100° C. or higher and 170° C. or lower. When the heating temperature is equal to or higher than the lower limit temperature, the reaction rate is sufficient and the reaction proceeds completely. When the heating temperature is equal to or lower than the upper limit temperature, the reaction proceeds uniformly, and the generation of large strain in the outermost layer can be prevented. In order to proceed the curing reaction uniformly, a method of heating at a relatively low temperature of lower than 100° C. and then further heating to 100° C. or higher to complete the reaction is also effective.

As light energy, an ultraviolet light (UV) emitting light source such as a high-pressure mercury lamp, a metal halide lamp, an electrodeless lamp bulb, or a light emitting diode having an emission wavelength mainly for UV can be used. A visible light source in accordance with an absorption wavelength of the curable compound or the photopolymerization initiator can be also selected.

From the viewpoint of the curability, a light emitting amount is preferably 100 $mJ/cm^2$ or more, more preferably 500 $mJ/cm^2$ or more, and particularly preferably 1,000 $mJ/cm^2$ or more. From the viewpoint of the electrical characteristics, the light emitting amount is preferably 20,000 $mJ/cm^2$ or less, more preferably 10,000 $mJ/cm^2$ or less, and particularly preferably 5,000 $mJ/cm^2$ or less.

Examples of radiation energy include those using an electron beam (EB).

Among the energy, light energy is preferred from the viewpoint of ease of reaction rate control, simplicity of apparatus, and length of pot life.

From the viewpoint of improving the electrical characteristics, a heat treatment may be performed after the curable composition is cured. The present invention does not exclude the heat treatment after curing, but does not require the heat treatment after curing. When the heat treatment is performed after curing, it is preferred that a temperature is generally 130° C. or lower and a heating time is generally kept to about 20 minutes or shorter.

<Conductive Support>

The conductive support is not particularly limited as long as it supports a layer formed thereon and exhibits conductivity. As the conductive support, for example, a metal material such as aluminum, an aluminum alloy, stainless steel, copper, or nickel, a resin material provided with conductivity by allowing a conductive powder of a metal, carbon, tin oxide, or the like to coexist, a resin obtained by depositing or applying a conductive material such as aluminum, nickel, or an indium tin oxide alloy (ITO) on a surface thereof, glass, and paper are mainly used. The conductive support can be in a form of a drum, sheet, belt, or the like. A conductive material having an appropriate resistance value may be applied onto the conductive support made of a metal material in order to control conductivity, surface properties, and the like and to cover defects.

When a metal material such as an aluminum alloy is used as the conductive support, an anodized film may be applied to the metal material before use.

For example, by anodizing the metal material in an acid bath such as chromic acid, sulfuric acid, oxalic acid, boric acid, and sulfamic acid, an anodized film is formed on the surface of the metal material. In particular, anodization in sulfuric acid provides better results.

In the case of anodization in sulfuric acid, it is preferred that a sulfuric acid concentration is set in a range of generally 100 g/l or more and 300 g/l or less, a dissolved aluminum concentration is set in a range of generally 2 g/l or more and 15 g/l or less, a liquid temperature is set in a range of generally 15° C. or higher and 30° C. or lower, an electrolysis voltage is set in a range of generally 10 V or more and 20 V or less, and a current density is set in a range of generally 0.5 $A/dm^2$ or more and 2 $A/dm^2$ or less, but the present invention is not limited to the above conditions.

An average film thickness of the anodized film is generally 20 μm or less, and particularly preferably 7 μm or less.

When applying an anodized film to the metal material, it is preferred to perform a sealing treatment. The sealing treatment can be performed by a known method. For example, a low-temperature sealing treatment in which the metal material is immersed in an aqueous solution containing nickel fluoride as a main component, or a high-temperature sealing treatment in which the metal material is immersed in an aqueous solution containing nickel acetate as a main component is preferably performed.

The surface of the conductive support may be smooth, or may be roughened by using a special cutting method or by performing a grinding treatment. The surface thereof may be roughened by mixing particles having an appropriate particle diameter with the material constituting the support.

An undercoat layer to be described later may be provided between the conductive support and the photosensitive layer in order to improve adhesion, blocking properties, and the like.

<Undercoat Layer>

The present photoreceptor may include the undercoat layer between the photosensitive layer and the conductive support.

As the undercoat layer, for example, a resin or a resin with an organic pigment or metal oxide particles dispersed therein can be used. Examples of the organic pigment to be used in the undercoat layer include a phthalocyanine pigment, an azo pigment, a quinacridone pigment, an indigo pigment, a perylene pigment, a polycyclic quinone pigment, an anthanthrone pigment, and a benzimidazole pigment. Among them, a phthalocyanine pigment and an azo pigment, specifically, a phthalocyanine pigment and an azo pigment in the case of being used as the above-described charge generation material can be exemplified.

Examples of the metal oxide particles to be used in the undercoat layer include metal oxide particles containing one metal element such as titanium oxide, aluminum oxide, silicon oxide, zirconium oxide, zinc oxide, and iron oxide, and metal oxide particles containing a plurality of metal elements such as calcium titanate, strontium titanate, and barium titanate. As for the undercoat layer, only one kind of particles may be used, or a plurality of kinds of particles may be mixed and used in any ratio and in any combination.

Among the above metal oxide particles, titanium oxide or aluminum oxide is preferred, and titanium oxide is particularly preferred. For example, the surface of the titanium oxide particles may be treated with an inorganic compound such as tin oxide, aluminum oxide, antimony oxide, zirconium oxide, and silicon oxide, or an organic compound such as stearic acid, a polyol, and silicone. As a crystal form of the titanium oxide particles, any one of rutile, anatase, brookite and amorphous can be used. In addition, titanium oxide particles of a plurality of crystal states may be contained.

A particle diameter of the metal oxide particles used in the undercoat layer is not particularly limited. In terms of properties of the undercoat layer and stability of the solution for forming the undercoat layer, an average primary particle diameter of the metal oxide particles is preferably 10 nm or more, and is preferably 100 nm or less, and more preferably 50 nm or less.

Here, the undercoat layer is preferably formed by dispersing particles in a binder resin. The binder resin to be used in the undercoat layer can be selected from: a polyvinyl acetal-based resin such as a polyvinyl butyral resin, a polyvinyl formal resin, and a partially acetalized polyvinyl butyral resin where butyral is partially modified with formal or acetal; a polyarylate resin, a polycarbonate resin, a polyester resin, a modified ether-based polyester resin, a phenoxy resin, a polyvinyl chloride resin, a polyvinylidene chloride resin, a polyvinyl acetate resin, a polystyrene resin, an acrylic resin, a methacrylic resin, a polyacrylamide resin, a polyamide resin, a polyvinylpyridine resin, a cellulose resin, a polyurethane resin, an epoxy resin, a silicone resin, a polyvinyl alcohol resin, a polyvinylpyrrolidone resin, and casein; a vinyl chloride-vinyl acetate-based copolymer such as a vinyl chloride-vinyl acetate copolymer, a hydroxy-modified vinyl chloride-vinyl acetate copolymer, a carboxyl-modified vinyl chloride-vinyl acetate copolymer, and a vinyl chloride-vinyl acetate-maleic anhydride copolymer; a styrene-butadiene copolymer, and a vinylidene chloride-acrylonitrile copolymer; an insulating resin such as a styrene-alkyd resin, a silicone-alkyd resin, and a phenol-formaldehyde resin; and an organic photoconductive polymer such as poly-N-vinylcarbazole, polyvinylanthracene, and polyvinylperylene. The present invention is not limited to these polymers. The binder resin may be used alone, may be used in combination of two or more kinds thereof, or may be used in a form of being cured together with a curing agent.

Among them, a polyvinyl acetal-based resin such as a polyvinyl butyral resin, a polyvinyl formal resin, and a partially acetalized polyvinyl butyral resin where butyral is partially modified with formal or acetal, an alcohol-soluble copolyamide, and a modified polyamide are preferred because of exhibiting good dispersibility and coatability. Among them, an alcohol-soluble copolyamide is particularly preferred.

A mixing ratio of the particles to the binder resin can be freely selected. Use in a range of 10 mass % to 500 mass % is preferred in terms of stability and coatability of the dispersion liquid.

A film thickness of the undercoat layer can be freely selected. The film thickness is preferably 0.1 μm or more and 20 μm or less from the viewpoint of the characteristics of the electrophotographic photoreceptor and the coatability of the dispersion liquid. In addition, the undercoat layer may contain a known antioxidant or the like.

<<Present Image Forming Device>>

An image forming device ("the present image forming device") includes the present photoreceptor.

As shown in FIG. 1, the present image forming device includes a photoreceptor 1, a charging device 2, an exposure device 3, and a developing device 4, and further includes, if necessary, a transfer device 5, a cleaning device 6, and a fixing device 7.

The present photoreceptor 1 is not particularly limited as long as it is the present electrophotographic photoreceptor described above. FIG. 1 shows, as an example, a drum-shaped photoreceptor in which the above-described photosensitive layer is formed on the surface of a cylindrical conductive support. The charging device 2, the exposure device 3, the developing device 4, the transfer device 5, and the cleaning device 6 are arranged along an outer peripheral surface of the present photoreceptor 1.

The charging device 2 charges the present photoreceptor 1, and uniformly charges the surface of the present photoreceptor 1 to have a predetermined potential. Examples of a general charging device include a non-contact corona charging device such as a corotron and a scorotron, and a contact type charging device (direct type charging device) in which a charging member to which a voltage is applied is brought into contact with and charge the photoreceptor surface. Examples of the contact type charging device include a charging roller and a charging brush. FIG. 1 shows a roller type charging device (a charging roller) as an example of the charging device 2.

The charging roller is generally produced by integrally molding a resin, an additive such as a plasticizer, and the like with a metal shaft, and may have a layered structure, if necessary. The voltage applied during charging may be only a direct current voltage, or an alternating current voltage superimposed on a direct current voltage.

The kind of the exposure device 3 is not particularly limited as long as it can expose the present photoreceptor 1 to form an electrostatic latent image on the photosensitive surface of the present photoreceptor 1. Specific examples thereof include a halogen lamp, a fluorescent lamp, a laser such as a semiconductor laser or a He—Ne laser, and an LED.

In addition, the exposure may be performed by a photoreceptor internal exposure method. Any light may be used for exposure. For example, exposure may be performed with monochromatic light having a wavelength of 780 nm, monochromatic light having a slightly short wavelength of 600 nm to 700 nm, or monochromatic light having a short wavelength of 380 nm to 500 nm.

Any kind of toner T may be used, and in addition to a powder toner, a polymerized toner obtained by using a suspension polymerization method, an emulsion polymerization method, or the like can be used. In particular, in the case of using a polymerized toner, it is preferred to use a toner having a small particle diameter of about 4 μm to 8 μm, and the shape of toner particles can be used in various ways, from those close to a spherical shape to those deviating from a spherical shape such as a rod shape. The polymerized toner is excellent in charge uniformity and transferability, and is suitably used for high image quality.

The kind of the transfer device 5 is not particularly limited, and a device using any method such as an electrostatic transfer method such as corona transfer, roller transfer, or belt transfer, a pressure transfer method, or an adhesive transfer method can be used. Here, it is assumed that the transfer device 5 includes a transfer charger, a transfer roller, a transfer belt, and the like which are disposed to face the present photoreceptor 1. The transfer device 5 applies a predetermined voltage value (a transfer voltage) having a polarity opposite to a charge potential of the toner T, and transfers a toner image formed on the present photoreceptor 1 to a recording sheet (paper, a medium) P.

The cleaning device 6 is not particularly limited, and any cleaning device such as a brush cleaner, a magnetic brush cleaner, an electrostatic brush cleaner, a magnetic roller cleaner, and a blade cleaner can be used. The cleaning device 6 scrapes off the residual toner adhering to the photoreceptor 1 with a cleaning member and collects the residual toner. When there is little or almost no toner remaining on the photoreceptor surface, the cleaning device 6 may be omitted.

In the electrophotographic apparatus configured as described above, image recording is performed as follows. That is, first, the surface (the photosensitive surface) of the photoreceptor 1 is charged to have a predetermined potential (for example, 600 V) by the charging device 2. At this time, the photosensitive surface of the photoreceptor 1 may be charged with a direct current voltage, or may be charged by superimposing an alternating current voltage on a direct current voltage.

Subsequently, the charged photosensitive surface of the photoreceptor 1 is exposed by the exposure device 3 in accordance with an image to be recorded to form an electrostatic latent image on the photosensitive surface. Then, the electrostatic latent image formed on the photosensitive surface of the photoreceptor 1 is developed by the developing device 4.

The developing device 4 thins the toner T supplied by a supply roller 43 by a regulating member (a developing blade) 45, frictionally charges the toner T to have a predetermined polarity (here, a positive polarity same as the charging potential of the photoreceptor 1), conveys the toner T while carrying the toner T on the developing roller 44, and brings the toner T into contact with the surface of the photoreceptor 1.

When the charged toner T carried on the developing roller 44 is brought into contact with the surface of the photoreceptor 1, a toner image corresponding to the electrostatic latent image is formed on the photosensitive surface of the photoreceptor 1. The toner image is transferred onto the recording paper P by the transfer device 5. Thereafter, the toner remaining on the photosensitive surface of the photoreceptor 1 without being transferred is removed by the cleaning device 6.

After the toner image is transferred onto the recording paper P, the toner image is thermally fixed onto the recording paper P by being passed through the fixing device 7 to obtain a final image.

In addition to the configuration described above, the image forming device may have, for example, a configuration capable of performing a charge elimination step.

The image forming device may be further modified and configured. For example, the image forming device may be configured to perform a step such as a pre-exposure step and an auxiliary charging step, may be configured to perform offset printing, or may be configured to be of a full-color tandem type using a plurality of types of toners.

<<Present Electrophotographic Cartridge>>

The present photoreceptor 1 is combined with one or more of the charging device 2, the exposure device 3, the developing device 4, the transfer device 5, the cleaning device 6, and the fixing device 7 to form an integrated cartridge (referred to as "the present electrophotographic cartridge").

The present electrophotographic cartridge can be configured to be detachable from an electrophotographic apparatus main body such as a copier or a laser beam printer. In this case, for example, when the present photoreceptor 1 or other members are deteriorated, the electrophotographic photoreceptor cartridge is detached from an image forming device main body, and another new electrophotographic photoreceptor cartridge is attached to the image forming device main body, thereby facilitating maintenance and management of the image forming device.

<<Description of Phrases>>

In the present invention, unless otherwise specified, "X to Y" (X and Y are any number) includes a meaning of "X or more and Y or less", and also includes a meaning of "preferably larger than X" or "preferably smaller than Y".

In addition, "X or more" (X is any number) or "Y or less" (Y is any number) also includes an intention of "preferably larger than X" or "preferably smaller than Y".

In the present invention, the upper limit and lower limit when specifying a numerical range are numerical values in consideration of significant figures. For example, the expression "3.6 eV" includes a value from which 3.6 eV is obtained by rounding off two decimal places. For example, 3.55 eV and 3.64 eV are included in 3.6 eV.

EXAMPLES

The present invention will be further described with reference to the following Examples. Examples are not intended to limit the present invention by any method.

[Coating Liquid P1 for Forming Undercoat Layer]

A coating liquid P1 for forming an undercoat layer obtained by containing rutile-type white titanium oxide surface-treated with methyldimethoxysilane and a copolyamide in which a composition molar ratio of ε-caprolactam/bis(4-amino-3-methylcyclohexyl)methane/hexamethylenediamine/decamethylenedicarboxylic acid/octadecamethylenedicarboxylic acid was 60/15/5/15/5<mass ratio of titanium oxide to copolyamide: 3/1> in a solvent mixture (mass ratio of methanol/1-propanol/toluene: 7/1/2) at a solid content concentration of 18% was used.

[Coating Liquid Q1 for Forming Charge Generation Layer]

10 parts of oxytitanium phthalocyanine, having a characteristic peak at a Bragg angle ($2\theta\pm0.2°$) of 27.3° in a powder X-ray spectrum pattern using CuKα rays, as a charge generation material and 5 parts of a polyvinyl acetal resin (trade name: DK31, manufactured by Denki Kagaku Kogyo Co., Ltd.) as a binder resin were mixed with 500 parts of 1,2-dimethoxyethane, and the mixture was pulverized by a sand grind mill and subjected to a dispersion treatment to obtain a coating liquid Q1 for forming a charge generation layer.

[Coating Liquid R1 for Forming Charge Transport Layer]

100 parts of a polyarylate resin represented by the following structural formula (A) (viscosity average molecular weight: 43,000) as a binder resin, 40 parts of a hole transport material (HTM) represented by the following structural formula (B), 4 parts of a hindered phenol-based antioxidant (trade name: Irg1076, manufactured by BASF), and 0.05 part of a silicone oil (trade name: KF-96, manufactured by Shin-Etsu Chemical Co., Ltd.) were dissolved in a solvent mixture of tetrahydrofuran:toluene=8/2, and mixed with stirring to obtain a coating liquid R1 for forming a charge transport layer having a solid content concentration of 16.5%.

Formula (A)

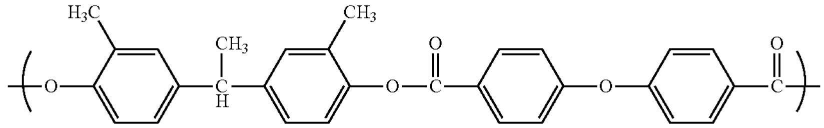

Formula (B)

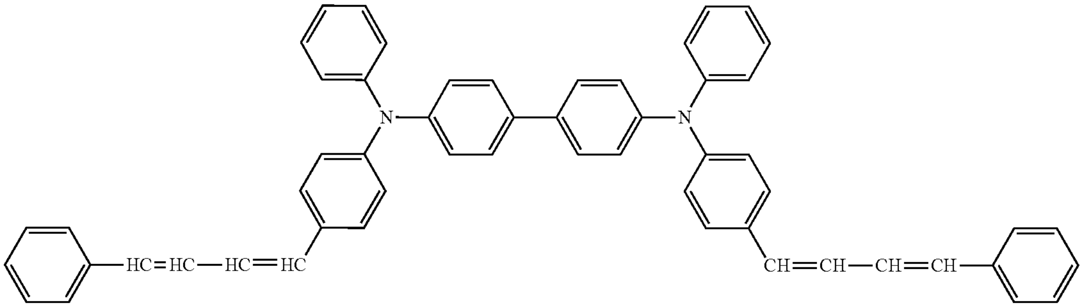

[Coating Liquid R2 for Forming Charge Transport Layer]

100 parts of a polyarylate resin represented by the structural formula (A) (viscosity average molecular weight: 43,000), 40 parts of a hole transport material (HTM) represented by the following structural formula (C), 4 parts of a hindered phenol-based antioxidant (trade name: Irg1076, manufactured by BASF), and 0.05 part of a silicone oil (trade name: KF-96, manufactured by Shin-Etsu Chemical Co., Ltd.) were dissolved in a solvent mixture of tetrahydrofuran:toluene=8/2, and mixed with stirring to obtain a coating liquid R2 for forming a charge transport layer having a solid content concentration of 16.5%.

Formula (C)

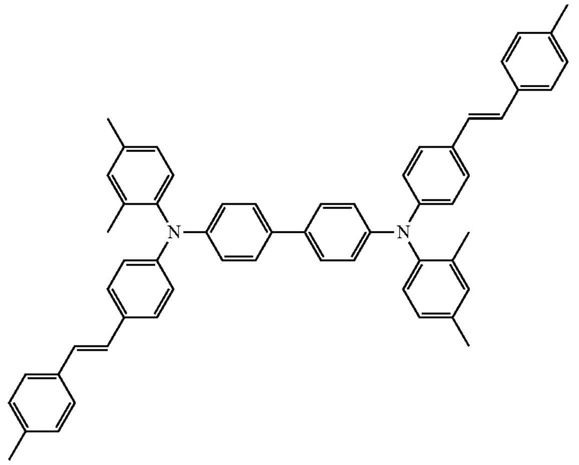

[Coating Liquid R3 for Forming Charge Transport Layer]

100 parts of a polyarylate resin represented by the structural formula (A) (viscosity average molecular weight: 43,000), 60 parts of a hole transport material (HTM) represented by the following structural formula (D), 4 parts of a hindered phenol-based antioxidant (trade name: Irg1076, manufactured by BASF), and 0.05 part of a silicone oil (trade name: KF-96, manufactured by Shin-Etsu Chemical Co., Ltd.) were dissolved in a solvent mixture of tetrahydrofuran:toluene=8/2, and mixed with stirring to obtain a coating liquid R3 for forming a charge transport layer having a solid content concentration of 18.0%.

Formula (D)

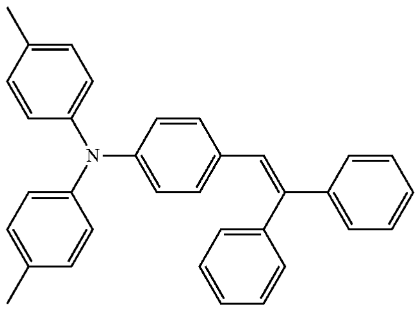

[Coating Liquid R4 for Forming Charge Transport Layer]

100 parts of a polyarylate resin represented by the structural formula (A) (viscosity average molecular weight: 43,000), 60 parts of a hole transport material (HTM) represented by the following structural formula (E), 4 parts of a hindered phenol-based antioxidant (trade name: Irg1076, manufactured by BASF), and 0.05 part of a silicone oil (trade name: KF-96, manufactured by Shin-Etsu Chemical Co., Ltd.) were dissolved in a solvent mixture of tetrahydrofuran:toluene=8/2, and mixed with stirring to obtain a coating liquid R4 for forming a charge transport layer having a solid content concentration of 18.0%.

Formula (E)

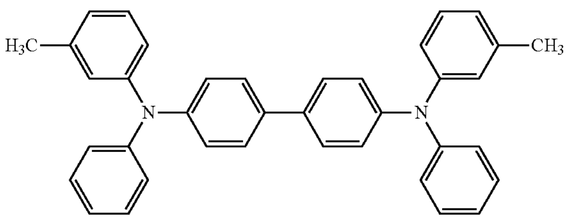

[Coating Liquid R5 for Forming Charge Transport Layer]

100 parts of a polyarylate resin represented by the structural formula (A) (viscosity average molecular weight: 43,000), 40 parts of a hole transport material (HTM) represented by the following structural formula (F), 4 parts of a hindered phenol-based antioxidant (trade name: Irg1076, manufactured by BASF), and 0.05 part of a silicone oil (trade name: KF-96, manufactured by Shin-Etsu Chemical Co., Ltd.) were dissolved in a solvent mixture of tetrahydrofuran:toluene=8/2, and mixed with stirring to obtain a coating liquid R5 for forming a charge transport layer having a solid content concentration of 16.5%.

Formula (F)

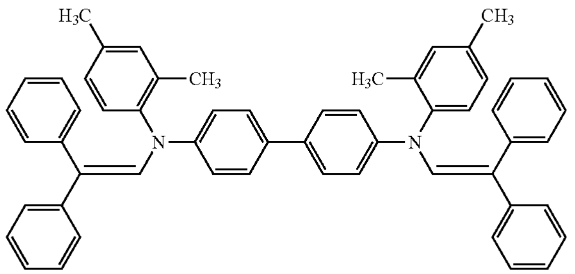

[Coating Liquid R6 for Forming Charge Transport Layer]

100 parts of a polyarylate resin represented by the structural formula (A) (viscosity average molecular weight: 43,000), 40 parts of a hole transport material represented by the structural formula (F), 1 part of a radical acceptor compound represented by the following structural formula (G) (electron transport material, indicated as "G" in the table, electron affinity: 3.83 eV), 4 parts of a hindered phenol-based antioxidant (trade name: Irg1076, manufactured by BASF), and 0.05 part of a silicone oil (trade name: KF-96, manufactured by Shin-Etsu Chemical Co., Ltd.) were dissolved in a solvent mixture of tetrahydrofuran: toluene=8/2, and mixed with stirring to obtain a coating liquid R6 for forming a charge transport layer having a solid content concentration of 16.5%.

An energy difference between a HOMO level and a LUMO level of the radical acceptor compound G was 2.39 eV.

Formula (G)

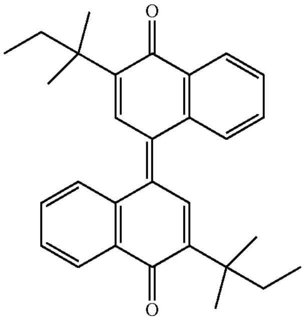

[Coating Liquid S1 for Forming Protective Layer]

Rutile-type white titanium oxide having an average primary particle diameter of 40 nm (product name: TTO55N, manufactured by ISHIHARA SANGYO KAISHA, LTD.) and 7 parts by mass of 3-methacryloxypropyltrimethoxysilane with respect to 100 parts by mass of the rutile-type white titanium oxide were stirred with a super mixer by a shearing force until a temperature in the mixer reached 150° C. to perform a surface treatment. Next, 1000 g of a raw material slurry obtained by mixing 250 g of the surface-treated titanium oxide and 750 g of methanol was subjected to a dispersion treatment for 30 minutes in a circulation state with a rotor peripheral speed of 9 m/s and a liquid flow rate of 2.8 g/s by using an Ultra Apex Mill (UAM-015 type) having a mill volume of about 0.15 L (manufactured by KOTOBUKI KOGYOU CO., LTD.) with zirconia beads having a diameter of about 50 μm (YTZ manufactured by Nikkato Corporation) as a dispersion medium, thereby preparing a dispersion liquid of titanium oxide. A urethane acrylate oligomer (product name: UV6300B, manufactured by Mitsubishi Chemical Corporation) dissolved in a solvent mixture containing methanol, 1-propanol, and toluene in advance was mixed with benzophenone and Omnirad TPO H (2,4,6-trimethylbenzoyl-diphenylphosphine oxide) as a polymerization initiator to obtain a coating liquid S1 for forming a protective layer in which UV6300B/surface-treated titania/benzophenone/Omnirad TPO H=100/55/1/2, a solvent composition was methanol/1-propanol/toluene=7/1/2, and a solid content concentration was 18.0%.

Comparative Example 1

An aluminum cylinder having a diameter of 30 mm and a length of 248 mm, the surface of which had been subjected to cutting, was dip-coated with the coating liquid P1 for forming an undercoat layer, and then an undercoat layer was provided such that a dry film thickness thereof was 1.5 μm. The undercoat layer was dip-coated with the coating liquid Q1 for forming a charge generation layer such that a dry film thickness thereof was 0.3 μm. The charge generation layer was dip-coated with the coating liquid R1 for forming a charge transport layer to form a charge transport layer such that a dry film thickness thereof was 20.0 μm. The charge transport layer was ring-coated with the coating liquid S1 for forming a protective layer, dried at room temperature for 20 minutes, and then irradiated with light from a metal halide lamp at an illuminance of 140 $mW/cm^2$ for 2 minutes while rotating the photoreceptor at 60 rpm in a nitrogen atmosphere (oxygen concentration: 1% or less) to form a protective layer having a cured film thickness of 1.0 μm, thereby preparing a photoreceptor D1.

Comparative Example 2

A photoreceptor D2 was prepared in the same manner as in the preparation of the photoreceptor D1 except that the coating liquid R1 for forming a charge transport layer was changed to the coating liquid R2 for forming a charge transport layer.

Comparative Example 3

A photoreceptor D3 was prepared in the same manner as in the preparation of the photoreceptor D1 except that the coating liquid R1 for forming a charge transport layer was changed to the coating liquid R3 for forming a charge transport layer.

Comparative Example 4

A photoreceptor D4 was prepared in the same manner as in the preparation of the photoreceptor D1 except that the coating liquid R1 for forming a charge transport layer was changed to the coating liquid R5 for forming a charge transport layer, and the irradiation conditions of the metal halide lamp when curing the protective layer were changed to irradiation at an illuminance of 140 $mW/cm^2$ for 10 seconds.

Comparative Example 5

A photoreceptor D5 was prepared in the same manner as in the preparation of the photoreceptor D1 except that the irradiation conditions of the metal halide lamp when curing the protective layer were changed to irradiation at an illuminance of 140 $mW/cm^2$ for 10 seconds.

Example 1

A photoreceptor D6 was prepared in the same manner as in the preparation of the photoreceptor D1 except that the coating liquid R1 for forming a charge transport layer was changed to the coating liquid R4 for forming a charge transport layer.

Example 2

A photoreceptor D7 was prepared in the same manner as in the preparation of the photoreceptor D1 except that the coating liquid R1 for forming a charge transport layer was changed to the coating liquid R5 for forming a charge transport layer.

Example 3

A photoreceptor D8 was prepared in the same manner as in the preparation of the photoreceptor D1 except that the coating liquid R1 for forming a charge transport layer was changed to the coating liquid R6 for forming a charge transport layer.

Example 4

A photoreceptor D9 was prepared in the same manner as in the preparation of the photoreceptor D1 except that the coating liquid R1 for forming a charge transport layer was changed to the coating liquid R5 for forming a charge transport layer, and the irradiation conditions of the metal halide lamp when curing the protective layer were changed to irradiation at an illuminance of 140 $mW/cm^2$ for 20 seconds.

[Energy Difference between HOMO Level and LUMO Level of Hole Transport Material (HTM)]

The energy difference between the HOMO level and the LUMO level of the hole transport materials used in the present Examples, Comparative Examples, and Reference Examples are shown in Table 2.

TABLE 2

| HTM (formula number) | Energy difference (eV) between HOMO level and LUMO level |
|---|---|
| Formula B | 3.05 |
| Formula C | 3.31 |
| Formula D | 3.49 |
| Formula E | 3.91 |
| Formula F | 3.65 |

[Evaluation of Martens Hardness]

The photoreceptors D1 to D9 were measured under the following measurement conditions from a front surface side of the photoreceptor under an environment of a temperature of 25° C. and a relative humidity of 50% by using a microhardness tester (FISCHERSCOPE HM 2000, manufactured by Fischer). The Martens hardness of each sample is shown in Table 3.

(Martens Hardness Measurement Conditions)

Indenter: Vickers quadrangular pyramid diamond indenter having facing angle of 136°

Maximum indentation load: 0.2 mN

Loading time: 10 seconds

Loading removing time: 10 seconds

The Martens hardness is determined by the following equation.

Martens hardness ($N/mm^2$)=maximum indentation load/indentation area at maximum indentation load

[Evaluation of Electrical Characteristics]

Next, every two of the photoreceptors D1 to D9 prepared in Examples and Comparative Examples were prepared, one of which was left as it was ("no heating" in the table), and the other of which was heat-treated at 125° C. for 10 minutes ("heating" in the table), and after the temperature of the photoreceptor was returned to room temperature, the two photoreceptors were mounted on an electrophotographic characteristic evaluation apparatus (described in Basics and Applications of Sequel Electrophotography Technique, edited by The Society of Electrophotography of Japan, CORONA PUBLISHING CO., LTD., p. 404-405) manufactured according to the standards of the Society of Electrophotography of Japan. According to the following procedure, the electrical characteristics after cycles of charging (negative polarity), exposure, potential measurement, and charge elimination were evaluated under an environment of 25° C./50% RH.

The photoreceptor was charged so as to have an initial surface potential of −700 V, and a surface potential (VL) before aging was measured after 60-millisecond exposure to monochromatic light having 780 nm obtained from a halogen lamp with an interference filter at an intensity of 1.0 $\mu J/cm^2$ (unit: —V, "surface potential VL before HH aging" in the table). The results are shown in Table 3. The smaller the absolute value of the surface potential (VL), the better the electrical characteristics.

After the electrical characteristics were measured, the drums were allowed to stand in an environment of 35° C./85% for 24 hours, then returned to room temperature, and then subjected to the above evaluation again to measure the surface potential (VL) after aging and after exposure (unit: —V, "surface potential VL after HH aging" in the table). The results are shown in Table 3. The smaller the absolute value of the surface potential (VL), the better the electrical characteristics.

[Evaluation of Abrasion Resistance]

Abrasion resistance was evaluated for the photoreceptors D4, D5, D7, and D9 prepared in Examples and Comparative Examples. The photoreceptors were mounted in an electrophotographic printer, and a 20,000 sheet printing test with an image print ratio of 5% was performed under an ambient temperature of 25° C. and a relative humidity of 50%. Before and after the printing test, a total film thickness of the photoreceptor (a film thickness of all layers formed on the conductive support) was measured, and an amount of reduction in film thickness (film reduction amount) due to the printing test was calculated.

The results are shown in Table 3. The smaller the film reduction amount, the better the abrasion resistance.

TABLE 3

| | Hardness ($N/mm^2$) | Coating liquid for forming charge transport layer | HTM | Radical acceptor compound | Before HH aging Surface potential VL (-V) No heating | Heating | After HH aging Surface potential VL (-V) No heating | Heating | Film reduction amount (μm) |
|---|---|---|---|---|---|---|---|---|---|
| Example 1 | 303 | R4 | E | No | 167 | 178 | 108 | 120 | — |
| Example 2 | 322 | R5 | F | No | 124 | 129 | 50 | 49 | 0.30 |
| Example 3 | 302 | R6 | F | G | 110 | 121 | 46 | 45 | — |
| Example 4 | 265 | R5 | F | No | 62 | 82 | 49 | 47 | 0.31 |
| Comparative Example 1 | 306 | R1 | B | No | 601 | 211 | 147 | 96 | — |
| Comparative Example 2 | 305 | R2 | C | No | 191 | 198 | 111 | 116 | — |
| Comparative Example 3 | 330 | R3 | D | No | 698 | 622 | 675 | 515 | — |
| Comparative Example 4 | 227 | R5 | F | No | 62 | 82 | 42 | 46 | 0.62 |
| Comparative Example 5 | 229 | R1 | B | No | 98 | 72 | 69 | 36 | 0.78 |

[Evaluation of Strong Exposure Characteristics]

The photoreceptors D7 and D8 prepared in Examples 2 and 3 were mounted on an electrophotographic characteristic evaluation apparatus (described in Basics and Applications of Sequel Electrophotography Technique, edited by The Society of Electrophotography of Japan, CORONA PUBLISHING CO., LTD., p. 404-405) manufactured according to the standards of the Society of Electrophotography of Japan, and the electrical characteristics after cycles of charging, exposure, potential measurement, and charge elimination were measured as follows.

First, under an environment of a temperature of 25° C. and a humidity of 50%, a grid voltage was adjusted to charge the photoreceptors so as to have an initial surface potential (V0) of −700 V. Next, the surface potential (VL) was measured after 60-millisecond exposure to exposure light at an intensity of 1.0 $\mu J/cm^2$. As the exposure light, monochromatic light having 780 nm obtained from a halogen lamp with an interference filter was used.

Subsequently, the photoreceptors were irradiated with light from a white fluorescent lamp (NEORMISUPER FL20SS•W/18, manufactured by Mitsubishi Osram Ltd.) for 10 minutes while adjusting the light intensity on the photoreceptor surface to 2000 lux. Thereafter, immediately after the irradiation, 10 minutes after the irradiation, and 60 minutes after the irradiation, the same measurement was performed at an initial grid voltage, and V0 and VL were measured.

Table 4 shows ΔV0 and ΔVL. ΔV0 is a value obtained by subtracting V0 before the white fluorescent lamp irradiation from V0 after the white fluorescent lamp irradiation. ΔVL is a value obtained by subtracting VL before the white fluorescent lamp irradiation from VL after the white fluorescent lamp irradiation. The smaller the absolute values of ΔV0 and ΔVL, the smaller the change in each potential even when irradiated with white light having high intensity, and the better the strong exposure characteristics.

TABLE 4

| | Coating liquid for forming charge transport layer | HTM | Radical acceptor compound | ΔVO (V) Immediately after irradiation | ΔVO (V) 10 minutes after irradiation | ΔVO (V) 60 minutes after irradiation | ΔVL (V) Immediately after irradiation | ΔVL (V) 10 minutes after irradiation | ΔVL (V) 60 minutes after irradiation |
|---|---|---|---|---|---|---|---|---|---|
| Example 2 | R5 | F | No | −25 | −21 | −17 | −24 | −19 | −13 |
| Example 3 | R6 | F | G | −3 | −1 | −2 | −9 | −9 | −3 |

[Evaluation of Ozone Resistance]

The photoreceptors D7 and D8 prepared in Examples 2 and 3 were mounted on an electrophotographic characteristic evaluation apparatus (described in Basics and Applications of Sequel Electrophotography Technique, edited by The Society of Electrophotography of Japan, CORONA PUBLISHING CO., LTD., p. 404-405) manufactured according to the standards of the Society of Electrophotography of Japan, and the electrical characteristics after cycles of charging, exposure, potential measurement, and charge elimination were measured as follows.

First, under an environment of a temperature of 25° C. and a humidity of 50%, a grid voltage is adjusted to charge the photoreceptors so as to have an initial surface potential (V0) of −700 V.

Subsequently, the photoreceptors were placed in a chamber coupled to an ozone generator (OZONIZER UNIT MODEL-0U65B, manufactured by EBARA JITSUGYO CO., LTD.), and the ozone generator was operated to allow the photoreceptors to stand for 5 hours after an ozone concentration in the chamber reached 200 ppm. Thereafter, the operation of the ozone generator was stopped, the ozone in the chamber was exhausted, and then the photoreceptors were taken out from the chamber. Immediately after and after two days from when the photoreceptors were taken out from the chamber, the same measurement was performed at the initial grid voltage, and V0 was measured.

Table 5 shows ΔV0. ΔV0 is a value obtained by subtracting V0 before ozone exposure from V0 after the ozone exposure. The smaller the absolute value of ΔV0 is, the smaller the change in potential even when exposed to ozone, and the better the ozone resistance.

TABLE 5

| | Coating liquid for forming charge transport layer | HTM | Radical acceptor compound | ΔV0 (V) Immediately after ozone exposure | ΔV0 (V) 2 days after ozone exposure |
|---|---|---|---|---|---|
| Example 2 | R5 | F | No | 42 | 234 |
| Example 3 | R6 | F | G | 50 | 92 |

Consideration

From the above Examples and the test results conducted by the present inventors, it is found that the photoreceptor according to the present invention has good electrical characteristics even when it includes a cured resin-based protective layer.

In this case, it is found that the hole transport material (HTM) is preferably the compound whose HOMO/LUMO energy level difference is greater than 3.6 eV and 4.0 eV or less, or the compound represented by the formula (I).

When forming a cured resin-based protective layer, it is common for curing to proceed due to involvement of a radical from a polymerization initiator or the like. Therefore, the radical also propagates to the hole transport material (HTM) in the photosensitive layer, and an HTM radical is likely to be generated. It is considered that the HTM radical serves as a charge trapping site and deteriorates the electrical characteristics. It is considered that the reason why the electrical characteristics are improved by heating is that the HTM radical is eliminated by the heat treatment.

Here, it is considered that, as the HTM, the compound whose HOMO/LUMO energy level difference is greater than 3.6 eV and 4.0 eV or less, or the compound represented by the formula (I) has small conjugation and an unstable radical structure, so that the HTM radical is less likely to be generated. Therefore, it can be considered that in the case of such an HTM, the deterioration of the electrical characteristics can be prevented.

It is found that the photoreceptor according to the present invention has a small film reduction amount and good abrasion resistance. Further, it is found that when the photosensitive layer contains the radical acceptor compound, the strong exposure characteristics and the ozone resistance can be further improved. In particular, it is presumed that when the energy difference between the HOMO level and the LUMO level of the radical acceptor compound is 3.0 eV or less, the radical acceptor compound preferentially absorbs light having a wavelength capable of damaging the hole transport material (HTM) over the hole transport material (HTM), and the damage of the hole transport material (HTM) can be prevented. That is, it is considered that the radical acceptor compound whose energy difference between the HOMO level and the LUMO level is 3.0 eV or less has the same effects as those of the radical acceptor compound G.

The same test as in the above Examples was conducted while changing the kind of the binder in the photosensitive layer, and the same results were obtained.

The invention claimed is:

1. An electrophotographic photoreceptor comprising:

a conductive support; and a photosensitive layer and a protective layer comprising a cured product obtained by curing a curable compound, which are sequentially disposed on the conductive support, wherein the protective layer comprises inorganic particles, a content of the inorganic particles in the protective layer is 10 parts by mass or more and 300 parts by mass or less with respect to 100 parts by mass of the curable compound, the inorganic particles are surface-treated with an organosilicon compound, the electrophotographic photoreceptor has Martens hardness of 255 $N/mm^2$ or more, and the photosensitive layer comprises a hole transport material (HTM), and an energy difference between a HOMO level and a LUMO level of the hole transport material (HTM) is greater than 3.6 eV and 4.0 eV or less.

2. The electrophotographic photoreceptor according to claim 1, wherein the energy difference between the HOMO level and the LUMO level of the hole transport material (HTM) is 3.8 eV or less.

3. The electrophotographic photoreceptor according to claim 1, wherein the inorganic particles comprise metal oxide particles, and a band gap of the metal oxide particles is smaller than the energy difference between the HOMO level and the LUMO level of the hole transport material (HTM).

4. The electrophotographic photoreceptor according to claim 1, wherein the curable compound comprises a photocurable compound.

5. The electrophotographic photoreceptor according to claim 1, wherein the protective layer comprises a curable compound, a polymerization initiator, and inorganic particles.

6. The electrophotographic photoreceptor according to claim 1, wherein the photosensitive layer is a multi-layered photosensitive layer comprises a charge generation layer and a charge transport layer in this order on the conductive support.

7. The electrophotographic photoreceptor according to claim 1, wherein the Martens hardness is 270 $N/mm^2$ or more.

8. The electrophotographic photoreceptor according to claim 1, wherein the hole transport material (HTM) comprises an enamine compound.

9. The electrophotographic photoreceptor according to claim 1, wherein the hole transport material (HTM) comprises a compound represented by a formula (I), Formula (I)

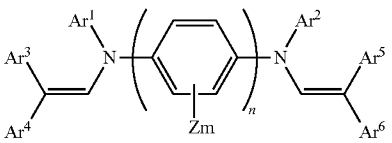

in the formula (I), $Ar^1$ to $Ar^6$ are same as or different from each other and each represent an aryl group which is optionally substituted, n represents an integer of 2 or more, Z represents a monovalent organic residue, m represents an integer of 0 to 4, and at least one of $Ar^1$ and $Ar^2$ is an aryl group having a substituent.

10. The electrophotographic photoreceptor according to claim 1, wherein the photosensitive layer comprises a radical acceptor compound.

11. The electrophotographic photoreceptor according to claim 10, wherein an energy difference between a HOMO level and a LUMO level of the radical acceptor compound is 3.0 eV or less.

12. The electrophotographic photoreceptor according to claim 10, wherein a content of the radical acceptor compound in the photosensitive layer is 0.1 part by mass or more and 10 parts by mass or less with respect to 100 parts by mass of the hole transport material (HTM) in the photosensitive layer.

13. The electrophotographic photoreceptor according to claim 1, wherein the electrophotographic photoreceptor is negatively charged.

14. An electrophotographic photoreceptor comprising:

a conductive support; and a photosensitive layer and a protective layer comprising a cured product obtained by curing a curable compound, which are sequentially disposed on the conductive support, wherein the protective layer comprises inorganic particles, a content of the inorganic particles in the protective layer is 10 parts by mass or more and 300 parts by mass or less with respect to 100 parts by mass of the curable compound, the inorganic particles are surface-treated with an organosilicon compound, the photosensitive layer comprises a hole transport material (HTM) composed of a compound represented by a formula (I), and an energy difference between a HOMO level and a LUMO level of the hole transport material (HTM) is greater than 3.6 eV and 4.0 eV or less, Formula (I)

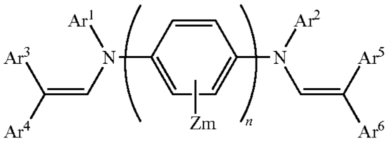

in the formula (I), $Ar^1$ to $Ar^6$ are same as or different from each other and each represent an aryl group which is optionally substituted, n represents an integer of 2 or more, Z represents a monovalent organic residue, m represents an integer of 0 to 4, and at least one of $Ar^1$ and $Ar^2$ is an aryl group having a substituent.

15. A method for producing the electrophotographic photoreceptor according to claim 1, the method comprising:

irradiating the protective layer with ultraviolet light and/or visible light to cure the protective layer.

16. A cartridge comprising:

the electrophotographic photoreceptor according to claim 1.

17. An image forming device comprising:

the electrophotographic photoreceptor according to claim 1.

18. The electrophotographic photoreceptor according to claim 1, wherein the content of the inorganic particles in the protective layer is 20 parts by mass or more and 200 parts by mass or less with respect to 100 parts by mass of the curable compound.

19. The electrophotographic photoreceptor according to claim 1, wherein the content of the inorganic particles in the protective layer is 30 parts by mass or more and 100 parts by mass or less with respect to 100 parts by mass of the curable compound.

* * * * *